US012456434B2

(12) United States Patent
Kim et al.

(10) Patent No.: US 12,456,434 B2
(45) Date of Patent: Oct. 28, 2025

(54) GATE DRIVER AND DISPLAY DEVICE INCLUDING SAME

(71) Applicant: LG DISPLAY CO., LTD., Seoul (KR)

(72) Inventors: Ju Hong Kim, Paju-si (KR); Byeong Seong So, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/921,929

(22) Filed: Oct. 21, 2024

(65) Prior Publication Data

US 2025/0218391 A1 Jul. 3, 2025

(30) Foreign Application Priority Data

Dec. 29, 2023 (KR) ........................ 10-2023-0197824

(51) Int. Cl.

*G09G 3/3266* (2016.01)
*G09G 3/3291* (2016.01)
*G09G 3/36* (2006.01)

(52) U.S. Cl.

CPC ......... *G09G 3/3266* (2013.01); *G09G 3/3291* (2013.01); *G09G 2310/0286* (2013.01); *G09G 2310/08* (2013.01); *G09G 2330/021* (2013.01)

(58) Field of Classification Search

CPC ........................... G09G 3/3266; G09G 3/3677
See application file for complete search history.

(56) References Cited

U.S. PATENT DOCUMENTS

| | | | |
|---|---|---|---|
| 10,991,302 B1 | 4/2021 | Park et al. | |
| 2012/0287099 A1 | 11/2012 | Toyotaka | |

(Continued)

FOREIGN PATENT DOCUMENTS

| | | | |
|---|---|---|---|
| JP | 2012-256031 A | 12/2012 | |
| JP | 2019-032519 A | 2/2019 | |
| JP | 2021-110940 A | 8/2021 | |
| JP | 2023-093319 A | 7/2023 | |

(Continued)

OTHER PUBLICATIONS

Office Action dated Jun. 10, 2025 issued with corresponding Japanese Patent Application No. 2024-185682 with the English translation.

(Continued)

*Primary Examiner* — Sepehr Azari
(74) *Attorney, Agent, or Firm* — Morgan, Lewis & Bockius LLP

(57) ABSTRACT

A gate driver may include signal transfer circuits, each signal transfer circuit receiving a carry signal from its preceding signal transfer circuit, and each signal transfer circuit operating dependently of its preceding signal transfer circuit. Each signal transfer circuit may include: a first output circuit for receiving the carry signal from its preceding signal transfer circuit and outputting a first gate signal according to voltages of first-1 and first-2 control nodes; a second output circuit for outputting a second gate signal according to voltages of second-1 and second-2 control nodes, in response to these second control nodes being connected to the first-2 and first-1 control nodes, respectively; and a third output circuit for outputting a third gate signal according to voltages of third-1 and third-2 control nodes, in response to these third control nodes being connected to the first-2 and first-1 control nodes, respectively. A display device is also disclosed.

20 Claims, 16 Drawing Sheets

(56) References Cited

U.S. PATENT DOCUMENTS

| | | | | |
|---|---|---|---|---|
| 2014/0321599 | A1* | 10/2014 | Cho | G11C 19/28 377/64 |
| 2018/0174553 | A1 | 6/2018 | Bong et al. | |
| 2019/0043405 | A1 | 2/2019 | Noh et al. | |
| 2021/0104197 | A1 | 4/2021 | Choi et al. | |
| 2021/0150988 | A1* | 5/2021 | Yuan | G09G 3/20 |
| 2021/0201767 | A1* | 7/2021 | Park | G09G 3/32 |
| 2021/0201814 | A1* | 7/2021 | Choi | G09G 3/3275 |
| 2022/0208072 | A1* | 6/2022 | Jin | G09G 3/2092 |
| 2023/0197011 | A1 | 6/2023 | Hong et al. | |
| 2024/0194150 | A1* | 6/2024 | Noh | G09G 3/3291 |
| 2024/0355269 | A1* | 10/2024 | Kim | G09G 3/20 |
| 2025/0095557 | A1* | 3/2025 | Lin | G09G 3/3266 |
| 2025/0157412 | A1* | 5/2025 | Kim | G09G 3/3266 |

FOREIGN PATENT DOCUMENTS

| | | | |
|---|---|---|---|
| KR | 10-2014-0133033 | A | 11/2014 |
| KR | 10-2017-0081078 | A | 7/2017 |
| KR | 10-2018-0071642 | A | 6/2018 |
| KR | 10-2019-0021985 | A | 3/2019 |
| KR | 10-2021-0082904 | A | 7/2021 |

OTHER PUBLICATIONS

Search Report dated Apr. 4, 2025 issued in corresponding British Patent Application No. GB 2415175.5.

* cited by examiner

①

②

③

④

⑤

⑥

GATE DRIVER AND DISPLAY DEVICE INCLUDING SAME

CROSS-REFERENCE TO RELATED APPLICATIONS

This application claims the priority to and benefit of Korean Patent Application No. 10-2023-0197824, filed Dec. 29, 2023, the entire contents of which are incorporated herein by reference for all purposes.

BACKGROUND

1. Technical Field

The present disclosure relates to a gate driver and a display device including the same.

2. Description of the Related Art

Display devices may include a liquid crystal display (LCD) device, an electroluminescence display device, a field emission display (FED) device, a plasma display panel (PDP), and the like.

Electroluminescent display devices are categorized into inorganic light emitting display devices and organic light emitting display devices according to the material of a light emitting layer. An active-matrix type organic light emitting display device includes an organic light emitting diode (which may be referred to as an OLED) which emits light by itself, and has advantages in that a response speed is fast and luminous efficiency, luminance, and a viewing angle are large.

Some display devices, such as a liquid crystal display device or an organic light emitting display device, include a display panel including a plurality of sub-pixels, a driver outputting a driving signal for driving the display panel, a power supply generating power to be supplied to the display panel or the driver, and the like. The driver includes a gate driver that supplies a gate signal, such as a scan signal and emission signal to the display panel, and a data driver that supplies a data signal to the display panel.

In such a display device, when a driving signal such as a scan signal, a light emission (EM) signal, and a data signal is supplied to a plurality of pixels formed in the display panel, the selected pixel transmits light or emits light directly to thereby display an image.

The description of the related art should not be assumed to be prior art merely because it is mentioned in or associated with this section. The description of the related art includes information that describes one or more aspects of the subject technology, and the description in this section does not limit the invention.

SUMMARY

Each of a plurality of pixels includes a pixel circuit, and a plurality of switch elements included in a pixel circuit are driven according to a plurality of gate signals. As the number of switch elements increases, the number of gate signals may increase, and the size of the bezel increases because the number of gate drivers and signal lines configured to output the gate signals needs to be increased.

The inventors of the present disclosure have recognized the problems and needs of the related art, including the above-described problems and needs, have performed extensive research and experiments, and have developed a new invention. One or more aspects of the present disclosure are directed to a gate driver and a display device that substantially obviate one or more problems due to limitations and disadvantages of the related art.

The present disclosure provides a gate driver and a display device including the same.

It should be noted that aspects of the present disclosure are not limited to the above-described aspects, and other aspects of the present disclosure will be apparent to those skilled in the art from the present disclosure.

A gate driver according to one or more example embodiments of the present disclosure may include a plurality of signal transfer circuits, wherein each of the plurality of signal transfer circuits is connected to a respective carry line to which a respective preceding signal transfer circuit is configured to apply a respective carry signal, to cause each of the plurality of signal transfer circuits to operate dependently of at least the respective preceding signal transfer circuit, and wherein each of the plurality of signal transfer circuits includes: a first output circuit configured to receive the respective carry signal from the respective preceding signal transfer circuit and to output a carry signal and a first gate signal according to a voltage of a first-1 control node and a voltage of a first-2 control node; a second output circuit configured to output a second gate signal according to a voltage of a second-1 control node and a voltage of a second-2 control node, in response to the second-1 control node being connected to the first-2 control node and the second-2 control node being connected to the first-1 control node; and a third output circuit configured to output a third gate signal according to a voltage of a third-1 control node and a voltage of a third-2 control node, in response to the third-1 control node being connected to the first-2 control node and the third-2 control node being connected to the first-1 control node.

A display device according to one or more example embodiments of the present disclosure may include a display panel in which a plurality of data lines, a plurality of gate lines intersecting the data lines, and a plurality of pixels are arranged; a data driver configured to supply data voltages of pixel data to the plurality of data lines; and a gate driver configured to supply gate signals to the plurality of gate lines, wherein the gate driver includes a plurality of signal transfer circuits, wherein each of the plurality of signal transfer circuits is connected to a respective carry line to which a respective preceding signal transfer circuit is configured to apply a respective carry signal, to cause each of the plurality of signal transfer circuits to operate dependently of at least the respective preceding signal transfer circuit, and wherein each of the plurality of signal transfer circuits includes: a first output circuit configured to receive the respective carry signal from the respective preceding signal transfer circuit and to output a carry signal and a first gate signal according to a voltage of a first-1 control node and a voltage of a first-2 control node; a second output circuit configured to output a second gate signal according to a voltage of a second-1 control node and a voltage of a second-2 control node, in response to the second-1 control node being connected to the first-2 control node and the second-2 control node being connected to the first-1 control node; and a third output circuit configured to output a third gate signal according to a voltage of a third-1 control node and a voltage of a third-2 control node, in response to the third-1 control node being connected to the first-2 control node and the third-2 control node being connected to the first-1 control node.

A display device according to one or more example embodiments of the present disclosure may include a display panel in which a plurality of data lines, a plurality of gate lines intersecting the data lines, and a plurality of pixels are arranged; a data driver configured to supply data voltages of pixel data to the plurality of data lines; and a gate driver configured to supply gate signals to the plurality of gate lines, wherein the gate driver includes a plurality of signal transfer circuits, wherein each of the plurality of signal transfer circuits is connected to a respective carry line to which a respective preceding signal transfer circuit is configured to apply a respective carry signal, to cause each of the plurality of signal transfer circuits to operate dependently of at least the respective preceding signal transfer circuit, and wherein each of the plurality of signal transfer circuits includes: a first output circuit configured to receive the respective carry signal from the respective preceding signal transfer circuit, and configured to output a carry signal and a first gate signal based on the respective carry signal, a first-1 control signal, and a first-2 control signal; a second output circuit configured to receive the carry signal, and configured to output a second gate signal based on the carry signal and according to a second-1 control signal for being responsive to the first-2 control signal and a second-2 control signal for being responsive to the first-1 control signal; and a third output circuit configured to receive the carry signal, and configured to output a third gate signal based on the carry signal and according to a third-1 control signal for being responsive to the first-2 control signal and a third-2 control signal for being responsive to the first-1 control signal.

According to one or more aspects of the present disclosure, by implementing one light emission (EM) driver and two scan drivers which are separately driven, as one gate driver, the number of gate drivers, as well as the number of signal lines for them, and the number of pins on the pad may be reduce, thereby reducing the bezel size.

In one or more aspects of the present disclosure, since a plurality of gate signals are output using an internal signal without using a separate external signal, power consumption may be reduced and low power driving may be possible.

The effects of the present specification are not limited to the above-mentioned effects, and other effects that are not mentioned will be apparent to those skilled in the art from the present disclosure.

Additional features, advantages, and aspects of the present disclosure are set forth in part in the description that follows and in part will become apparent from the present disclosure or may be learned by practice of the inventive concepts provided herein. Other features, advantages, and aspects of the present disclosure may be realized and attained by the descriptions provided in the present disclosure, or derivable therefrom, and the claims hereof as well as the drawings. It is intended that all such features, advantages, and aspects be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing description and the following description of the present disclosure are examples, and are intended to provide further explanation of the disclosure as claimed.

BRIEF DESCRIPTION OF THE DRAWINGS

The accompanying drawings, which are included to provide a further understanding of the disclosure, are incorporated in and constitute a part of this disclosure, illustrate aspects and embodiments of the disclosure, and together with the description serve to explain principles and examples of the disclosure. In the drawings.

Figure 1:
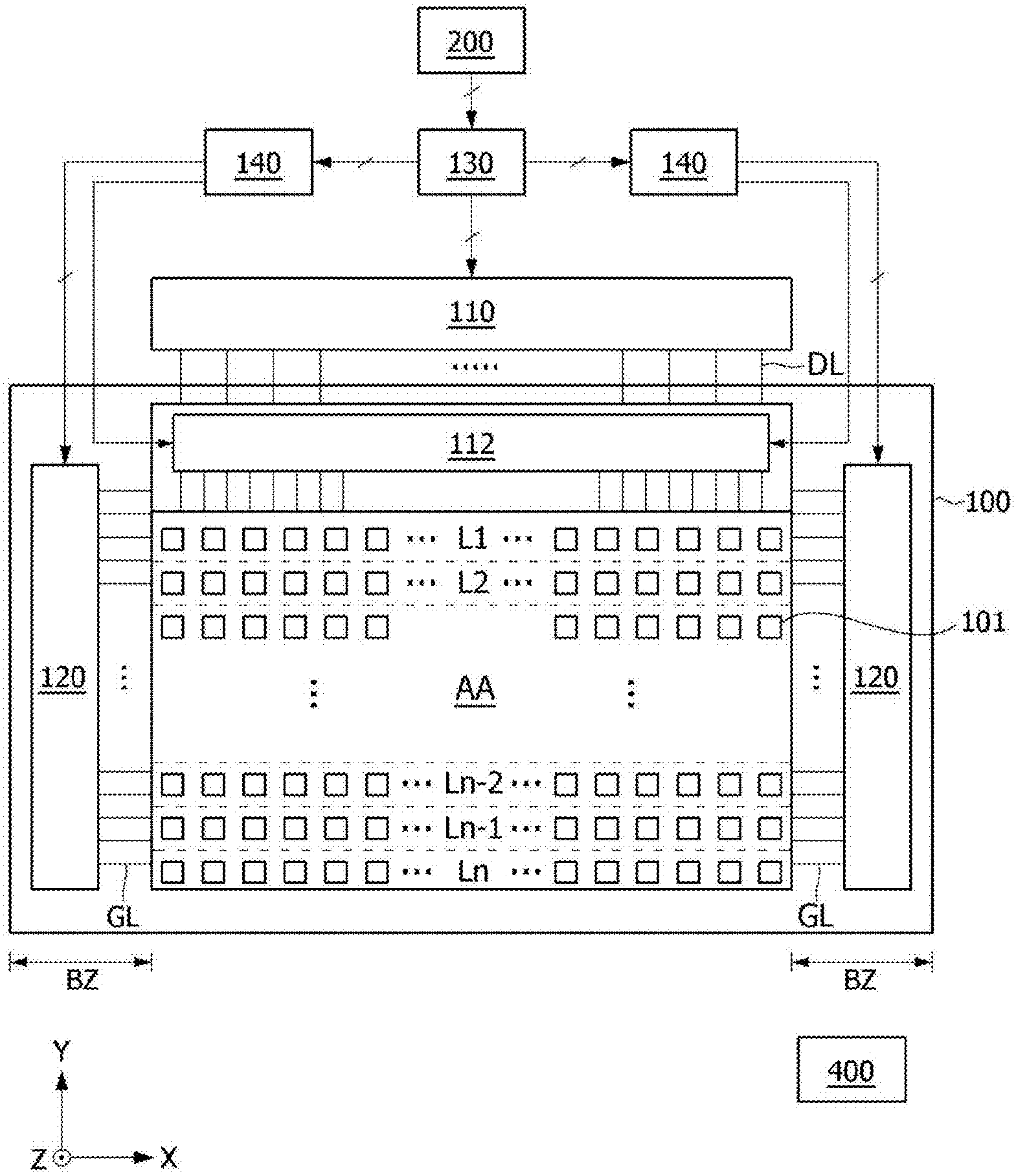
FIG. 1 is a block diagram illustrating a display device according to one example embodiment of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction thereof may be exaggerated for clarity, illustration, and/or convenience.

DETAILED DESCRIPTION

Advantages and features of the present specification and methods of achieving them will become apparent with reference to embodiments, which are described in detail, in conjunction with the accompanying drawings. However, the present specification is not limited to the embodiments described below and may be implemented in different forms, the embodiments are only provided to completely disclose the present disclosure and completely convey the scope of the present disclosure to those skilled in the art, and the present specification is defined by the disclosed claims and the equivalents thereof.

Reference is now made in detail to embodiments of the present disclosure, examples of which may be illustrated in the accompanying drawings. In the following description, when a detailed description of well-known methods, functions, structures or configurations may unnecessarily obscure aspects of the present disclosure, the detailed description thereof may have been omitted for brevity. Further, repetitive descriptions may be omitted for brevity.

The progression of processing steps and/or operations described is a non-limiting example.

The sequence of steps and/or operations is not limited to that set forth herein and may be changed to occur in an order that is different from an order described herein, with the exception of steps and/or operations necessarily occurring in a particular order. In one or more examples, two operations in succession may be performed substantially concurrently, or the two operations may be performed in a reverse order or in a different order depending on a function or operation involved.

Unless stated otherwise, like reference numerals may refer to like elements throughout even when they are shown in different drawings. Unless stated otherwise, the same reference numerals may be used to refer to the same or substantially the same elements throughout the specification and the drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the embodiments described with reference to the accompanying drawings. The present disclosure may, however, be embodied in different forms and should not be construed as limited to the embodiments set forth herein. Rather, these embodiments are examples and are provided so that this disclosure may be thorough and complete to assist those skilled in the art to understand the inventive concepts without limiting the protected scope of the present disclosure.

Shapes, dimensions (e.g., sizes, lengths, widths, heights, thicknesses, locations, radii, diameters, and areas), proportions, ratios, angles, numbers, the number of elements, and the like disclosed herein, including those illustrated in the drawings, are merely examples, and thus, the present disclosure is not limited to the illustrated details. It is, however, noted that the relative dimensions of the components illustrated in the drawings are part of the present disclosure.

When the term "comprise," "have," "include," "contain," "formed of," or the like is used with respect to one or more elements (e.g., components, circuits, transistors, control nodes, sections, parts, portions, steps, operations, and/or the like), one or more other elements may be added unless a term such as "only" or the like is used. The terms used in the present disclosure are merely used in order to describe particular example embodiments, and are not intended to limit the scope of the present disclosure. The terms of a singular form may include plural forms unless the context clearly indicates otherwise. The word "exemplary" is used to mean serving as an example or illustration. Embodiments are example embodiments. Aspects are example aspects. In one or more implementations, "embodiments," "examples," "aspects," and the like should not be construed to be preferred or advantageous over other implementations. An embodiment, an example, an example embodiment, an aspect, or the like may refer to one or more embodiments, one or more examples, one or more example embodiments, one or more aspects, or the like, unless stated otherwise. Further, the term "may" encompasses all the meanings of the term "can."

In one or more aspects, unless explicitly stated otherwise, an element, feature, or corresponding information (e.g., a level, range, dimension, size, or the like) is construed to include an error or tolerance range even where no explicit description of such an error or tolerance range is provided. An error or tolerance range may be caused by various factors (e.g., process factors, internal or external impact, noise, or the like). In interpreting a numerical value, the value is interpreted as including an error range unless explicitly stated otherwise.

When a positional relationship between two elements (e.g., components, circuits, transistors, control nodes, sections, parts, portions, and/or the like) are described using any of the terms such as "on," "under," "above," "upper," "lower," "near," "close to," "adjacent to," "beside," "preceding," "next to," and/or the like indicating a position or location, one or more other elements may be located between the two elements unless a more limiting term, such as "immediate(ly)," "direct(ly)," or "close(ly)," is used. For example, when an element and another element are described using any of the foregoing terms, this description should be construed as including a case in which the elements contact each other directly as well as a case in which one or more additional elements are disposed or interposed therebetween. Furthermore, the spatially relative terms such as the foregoing terms as well as other terms such as "left," "right," "upper," "lower," "up," "down," and the like refer to an arbitrary frame of reference. For example, these terms may be used for an example understanding of a relative relationship between elements, including any correlation as shown in the drawings. However, embodiments of the disclosure are not limited thereby or thereto. The spatially relative terms are to be understood as terms including different orientations of the elements in use or in operation in addition to the orientation depicted in the drawings or described herein.

In describing a temporal relationship, when the temporal order is described as, for example, "after," "subsequent," "next," "before," "previous," "preceding," "prior to," or the like, a case that is not consecutive or not sequential may be included and thus one or more other events may occur therebetween, unless a more limiting term, such as "just," "immediate(ly)," or "direct(ly)," is used.

It is understood that, although the terms "first," "second," "third," "first-1," "first-2," "first-3," "second-1," "second-2," "second-3," "third-1," "third-2," "third-3," and the like may be used herein to describe various elements (e.g., components, circuits, transistors, control nodes, sections, parts, portions, steps, operations, and/or the like), these elements should not be limited by these terms, for example, to any particular order, precedence, depiction, figure, or embodiment. These terms are used only to distinguish one element from another. For example, a first-1 element may denote a first-2 element, and, similarly, a first-2 element may denote a first-1 element. Furthermore, these elements (e.g., the first element, the second element, the first-1 element, the second-1 element, the third-2 element, and the like) may be arbitrarily named according to the convenience of those skilled in the art without departing from the scope of the present disclosure. For clarity, the functions or structures of these elements (e.g., the first element, the second element, the first-1 element, the second-1 element, the third-2 element, and the like) are not limited by ordinal numbers or the names in front of the elements. Further, a first element may include one or more first elements. Similarly, a second element or the like may include one or more second elements.

For the expression that an element (e.g., component, circuit, transistor, control node, section, part, portion, or the like) is "connected," "coupled," "linked," or the like to another element, the element can not only be directly connected, coupled, linked, or the like to another element, but also be indirectly connected, coupled, linked, or the like to another element with one or more intervening elements disposed or interposed between the elements, unless otherwise specified.

The phrase that an element (e.g., component, circuit, transistor, control node, section, part, portion, or the like) is "provided," "disposed," "connected," "coupled," or the like in, on, with or to another element may be understood, for example, as that at least a portion of the element is provided, disposed, connected, coupled, or the like in, on, with or to at least a portion of another element.

In description of flow of a signal, for example, when a signal is provided from a node A to a node B, this may include a case where the signal is transferred from the node A to the node B via one or more nodes unless a phrase such as "immediately transferred," "directly transferred" or the like is used.

The terms such as a "line" or "direction" should not be interpreted only based on a geometrical relationship in which the respective lines or directions are parallel, perpendicular, diagonal, or slanted with respect to each other, and may be meant as lines or directions having wider directivities within the range within which the components of the present disclosure may operate functionally.

The term "at least one" should be understood as including any and all combinations of one or more of the associated listed items. For example, each of the phrases "at least one of a first item, a second item, or a third item" and "at least one of a first item, a second item, and a third item" may represent (i) a combination of items provided by two or more of the first item, the second item, and the third item or (ii) only one of the first item, the second item, or the third item.

The expression of a first element, a second elements "and/or" a third element should be understood as one of the first, second and third elements or as any or all combinations of the first, second and third elements. By way of example, A, B and/or C may refer to only A; only B; only C; any of A, B, and C (e.g., A, B, or C); some combination of A, B, and C (e.g., A and B; A and C; or B and C); or all of A, B, and C. Furthermore, an expression "A/B" may be understood as A and/or B. For example, an expression "A/B" may refer to only A; only B; A or B; or A and B.

In one or more aspects, the terms "between" and "among" may be used interchangeably simply for convenience unless stated otherwise. Furthermore, when an element (e.g., component, circuit, transistor, control node, section, part, portion, or the like) is referred to as being "between" at least two elements, the element may be the only element between the at least two elements, or one or more intervening elements may also be present.

In one or more aspects, the phrases "each other" and "one another" may be used interchangeably simply for convenience unless stated otherwise.

In one or more aspects, the phrases "one or more among" and "one or more of" may be used interchangeably simply for convenience unless stated otherwise. In one or more aspects, unless stated otherwise, the term "(n)th" or the like may refer to "(n)nd" (e.g., 2nd where n is 2), or "(n)rd" (e.g., 3rd where n is 3), and n may be a natural number or a positive integer.

The term "or" means "inclusive or" rather than "exclusive or." That is, unless otherwise stated or clear from the context, the expression that "x uses a or b" means any one of natural inclusive permutations. For example, "a or b" may mean "a," "b," or "a and b." For example, "a, b or c" may mean "a," "b," "c," "a and b," "b and c," "a and c," or "a, b and c."

Features of various embodiments of the present disclosure may be partially or entirely coupled to or combined with each other, may be technically associated with each other, and may be variously operated, linked or driven together in various ways. Embodiments of the present disclosure may be implemented or carried out independently of each other or may be implemented or carried out together in a co-dependent or related relationship. In one or more aspects, the components of each apparatus and device according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein. For example, the term "part" may apply, for example, to a circuit or structure, an integrated circuit, a computational block of a circuit device, or any structure configured to perform a described function as should be understood by one of ordinary skill in the art.

The terms used herein have been selected as being general in the related technical field; however, there may be other terms depending on the development and/or change of technology, convention, preference of technicians, and so on. Therefore, the terms used herein should not be understood as limiting technical ideas, but should be understood as examples of the terms for describing example embodiments.

Further, in a specific case, a term may be arbitrarily selected by an applicant, and in this case, the detailed meaning thereof is described herein. Therefore, the terms used herein should be understood based on not only the name of the terms, but also the meaning of the terms and the content hereof.

In the following description, various example embodiments of the present disclosure are described in more detail with reference to the accompanying drawings. With respect to reference numerals to elements of each of the drawings, the same elements may be illustrated in other drawings, and like reference numerals may refer to like elements unless stated otherwise. The same or similar elements may be denoted by the same reference numerals even though they are depicted in different drawings. In addition, for convenience of description, a scale, dimension, size, and thickness of each of the elements illustrated in the accompanying drawings may be different from an actual scale, dimension, size, and thickness, and thus, embodiments of the present disclosure are not limited to a scale, dimension, size, and thickness illustrated in the drawings.

In a display device of the present disclosure, the pixel circuit and the gate driving circuit may include a plurality of transistors. Transistors may be implemented as oxide thin film transistors (oxide TFTs) including an oxide semiconductor, low temperature polysilicon (LTPS) TFTs including low temperature polysilicon, or the like.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS)), since carriers are holes, a source voltage is higher than a drain voltage such that holes may flow from a source to a drain. In the p-channel transistor, since holes flow from the source to the drain, a current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor will be referred to as a first electrode and a second electrode.

A gate signal swings between a gate-on voltage and a gate-off voltage. The gate-on voltage is set to a voltage higher than a threshold voltage of a transistor, and the gate-off voltage is set to a voltage lower than the threshold voltage of the transistor.

The transistor is turned on in response to the gate-on voltage and is turned off in response to the gate-off voltage. In the case of the n-channel transistor, a gate-on voltage may be a gate high voltage, and a gate-off voltage may be a gate low voltage. In the case of the p-channel transistor, a gate-on voltage may be a gate low voltage, and a gate-off voltage may be a gate high voltage.

Figure 2:
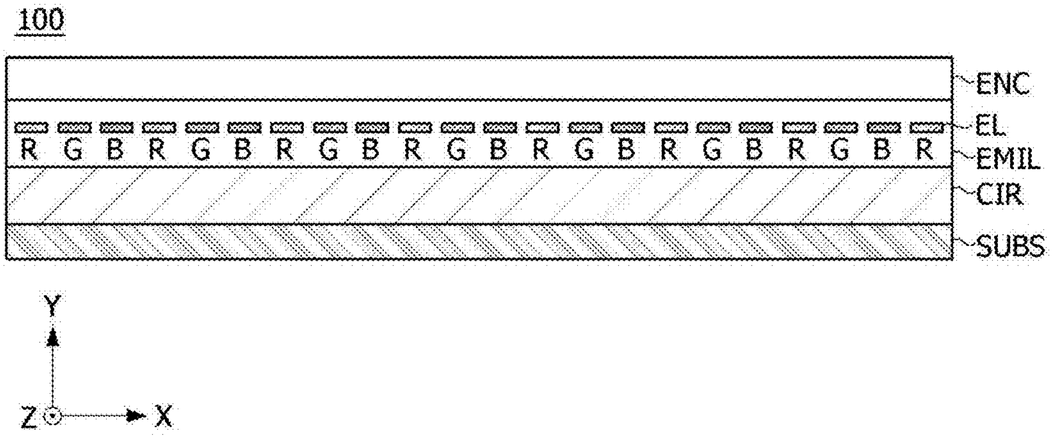
FIG. 2 is an example of a cross-sectional view illustrating a cross-sectional structure of the display panel shown in FIG. 1.

FIG. 1 is a block diagram illustrating a display device according to one example embodiment of the present disclosure. FIG. 2 is an example of a cross-sectional view illustrating a cross-sectional structure of the display panel shown in FIG. 1.

Referring to FIGS. 1 and 2, a display device according to an example embodiment of the present disclosure includes a display panel 100, a display panel driving unit configured to write pixel data to pixels of the display panel 100, and a power supply unit 400 configured to generate power required for driving the pixels and the display panel driving unit.

The display panel 100 includes a pixel array AA that displays an input image. The pixel array AA includes a plurality of data lines DL, a plurality of gate lines GL intersected with the data lines DL, and pixels arranged in a matrix form.

The pixel array AA includes a plurality of pixel lines L1 to Ln. Each of the pixel lines L1 to Ln includes one line of pixels arranged along a line direction X in the pixel array AA of the display panel 100. Pixels arranged in one pixel line share the gate lines GL. Sub-pixels arranged in a column direction Y along a data line direction share the same data line DL. One horizontal period 1H is a time obtained by dividing one frame period by the total number of pixel lines L1 to Ln.

Touch sensors may be disposed on the display panel 100. A touch input may be sensed using separate touch sensors or may be sensed through pixels. The touch sensors may be disposed as an on-cell type or an add-on type on the screen of the display panel or implemented as in-cell type touch sensors embedded in the pixel array AA.

The display panel 100 may be implemented as a flexible display panel. The flexible display panel may be made of a plastic OLED panel. An organic thin film may be disposed on a back plate of the plastic OLED panel, and the pixel array AA may be formed on the organic thin film.

The back plate of the plastic OLED may be a polyethylene terephthalate (PET) substrate. The organic thin film is formed on the back plate. The pixel array AA and a touch sensor array may be formed on the organic thin film. The back plate blocks moisture permeation so that the pixel array AA is not exposed to humidity. The organic thin film may be a thin Polyimide (PI) film substrate. A multi-layered buffer film may be formed of an insulating material (not shown) on the organic thin film. Lines may be formed on the organic thin film so as to supply power or signals applied to the pixel array AA and the touch sensor array.

To implement color, each of the pixels may be divided into a red sub-pixel (hereinafter referred to as "R sub-pixel"), a green sub-pixel (hereinafter referred to as "G sub-pixel"), and a blue sub-pixel (hereinafter referred to as "B sub-pixel"). Each of the pixels may further include a white sub-pixel. Each of the sub-pixels 101 includes a pixel circuit. The pixel circuit is connected to the data line DL and the gate line GL.

The cross-sectional structure of the display panel 100 may include a circuit layer CIR, a light-emitting element layer EMIL, and an encapsulation layer ENC stacked on a substrate SUBS, as shown in FIG. 2.

The circuit layer CIR may include a thin-film transistor (TFT) array including a pixel circuit connected to wirings such as a data line, a gate line, a power line, and the like, a gate driver, and a de-multiplexer. The circuit layer CIR includes a plurality of metal layers insulated with insulating layers interposed therebetween, and a semiconductor material layer. All transistors formed in the circuit layer CIR can be implemented as n-channel oxide TFTs.

The light-emitting element layer EMIL may include a light-emitting element driven by the pixel circuit. The light-emitting element may include a light-emitting element of a red sub-pixel, a light-emitting element of a green sub-pixel, and a light-emitting element of a blue sub-pixel. The light-emitting element layer EMIL may further include a light-emitting element of white sub-pixel. The light-emitting element layer EMIL corresponding to each of the sub-pixels may have a structure in which a light-emitting element and a color filter are stacked. The light-emitting elements EL in the light-emitting element layer EMIL may be covered by multiple protective layers including an organic film and an inorganic film.

The encapsulation layer ENC covers the light-emitting element layer EMIL to seal the circuit layer CIR and the light-emitting element layer EMIL. The encapsulation layer ENC may also have a multi-insulating film structure in which an organic film and an inorganic film are alternately stacked. The inorganic film blocks permeation of moisture and oxygen. The organic film planarizes the surface of the inorganic film. When the organic layer and the inorganic layer are stacked in multiple layers, the movement path of moisture and oxygen becomes longer than that of a single layer, so that penetration of moisture and oxygen affecting the light-emitting element layer EMIL may be effectively blocked.

A touch sensor layer (not shown) may be formed on the encapsulation layer ENC, and a polarizing plate or a color filter layer may be disposed thereon. The touch sensor layer may include capacitive touch sensors that sense a touch input based on a change in capacitance before and after the touch input. The touch sensor layer may have metal wiring patterns and insulating films that form the capacitance of the touch sensors. The insulating films may insulate an area where the metal wiring patterns intersect and may planarize the surface of the touch sensor layer. The polarizing plate may improve visibility and contrast ratio by converting the polarization of external light reflected by metal in the touch sensor layer and the circuit layer. The polarizing plate may be implemented as a circular polarizing plate or a polarizing plate in which a linear polarizing plate and a phase retardation film are bonded together. A cover glass may be adhered to the polarizing plate. The color filter layer may include red, green, and blue color filters. The color filter layer may further include a black matrix pattern. The color filter layer may replace the polarizing plate by absorbing a part of the wavelength of light reflected from the circuit layer and the touch sensor layer, and increase the color purity of an image reproduced in the pixel array.

The power supply unit 400 generates direct current (DC) power necessary to drive the display panel driving unit and the pixel array of the display panel 100 by using a DC-DC converter. The DC-DC converter may include a charge pump, a regulator, a buck converter, a boost converter, and the like. The power supply unit 400 may adjust a level of an input DC voltage applied from a host system (not shown) to generate constant voltages (or DC voltages) such as a gamma reference voltage VGMA, gate-on voltages VGH and VEH, gate-off voltages VGL and VEL, the pixel driving voltage EVDD, the low-potential power voltage EVSS, the initialization voltage VINIT, and the reference voltage VREF. The gamma reference voltage VGMA is supplied to a data driver 110. The gate-on voltages VGH and VEH and the gate-off voltages VGL and VEL are supplied to a gate driver 120. The constant voltages such as the pixel driving voltage EVDD, the low-potential power voltage EVSS, the initialization voltage VINIT, and the reference voltage VREF are commonly supplied to the pixels.

The display panel driving unit writes pixel data of an input image to the pixels of the display panel 100 under control of a timing controller (TCON) 130.

The display panel driving unit includes the data drivers 110 and the gate drivers 120.

A de-multiplexer (DEMUX) may be disposed between the data driver 110 and the data lines DL. The de-multiplexer is omitted from FIG. 1. The de-multiplexer sequentially connects one channel of the data driver 110 to the plurality of data lines DL and distributes in a time division manner the data voltage outputted from one channel of the data driver 110 to the data lines DL, thereby reducing the number of channels of the data driver 110.

The display panel driving circuit may further include a touch sensor driver for driving the touch sensors. The touch sensor driver is omitted from FIG. 1. In a mobile device, the timing controller 130, the power supply 400, the data driver 110, and the like may be integrated into one drive integrated circuit (IC).

The data driver 110 generates a data voltage Vdata by converting pixel data of an input image received from the timing controller 130 with a gamma compensation voltage every frame period by using a digital to analog converter (DAC). The gamma reference voltage VGMA is divided for respective gray scales through a voltage divider circuit. The gamma compensation voltage divided from the gamma reference voltage VGMA is provided to the DAC of the data driver 110. The data voltage Vdata is outputted through the output buffer in each of the channels of the data driver 110.

In the data driver 110, the output buffer included in one channel may be connected to adjacent data lines DL through the de-multiplexer array 112 (not shown). The de-multiplexer array 112 may be formed directly on the substrate of the display panel 100 or integrated into one drive IC together with the data driver 110.

The gate driver 120 may be implemented as a gate in panel (GIP) circuit formed directly on a bezel BZ area of the display panel 100 together with the TFT array of the pixel array AA. The gate driver 120 sequentially outputs gate signals to the gate lines GL under the control of the timing controller 130. The gate driver 120 may sequentially supply the gate signals to the gate lines GL by shifting the gate signals using a shift register.

The clock output from the level shifter 140 may swing between a gate-on voltage VGH and the gate-off voltage VGL, and may be supplied to the gate driver 120 through clock lines CL. The gate driver 120 may sequentially output gate signals using a clock output from the level shifter 140.

The timing controller 130 receives, from a host system (not shown), digital video data DATA of an input image and a timing signal synchronized therewith. The timing signal includes a vertical synchronization signal Vsync, a horizontal synchronization signal Hsync, a main clock CLK, a data enable signal DE, and the like. Because a vertical period and a horizontal period can be known by counting the data enable signal DE, the vertical synchronization signal Vsync and the horizontal synchronization signal Hsync may be omitted. The data enable signal DE has a cycle of one horizontal period (1H).

The timing controller 130 multiplies an input frame frequency by i and controls the operation timing of the display panel driving circuit with a frame frequency of the input frame frequency×i (i is a positive integer greater than 0) Hz. The input frame frequency is 60 Hz in the NTSC (National Television Standards Committee) scheme and 50 Hz in the PAL (Phase-Alternating Line) scheme.

Based on the timing signals Vsync, Hsync, and DE received from the host system, the timing controller 130 generates a data timing control signal for controlling the operation timing of the data driver 110, MUX signals for controlling the operation timing of the de-multiplexer array 112, and a gate timing control signal for controlling the operation timing of the gate driver 120.

The voltage level of the gate timing control signal outputted from the timing controller 130 may be converted into the gate-on voltages VGH and VEH and the gate-off voltages VGL and VEL through a level shifter (not shown) and then supplied to the gate driver 120. That is, the level shifter converts a low level voltage of the gate timing control signal into the gate-off voltages VGL and VEL and converts a high level voltage of the gate timing control signal into the gate-on voltages VGH and VEH. The gate timing signal includes the start pulse and the shift clock.

The host system may include a main board of one of a television system, a set-top box, a navigation system, a personal computer (PC), a home theater system, a vehicle system, and a mobile device system. In this case, the data driver 110, the gate driver 120, the timing controller 130, and the like may be integrated into one drive IC (DIC) in mobile devices or wearable devices.

Figure 3:
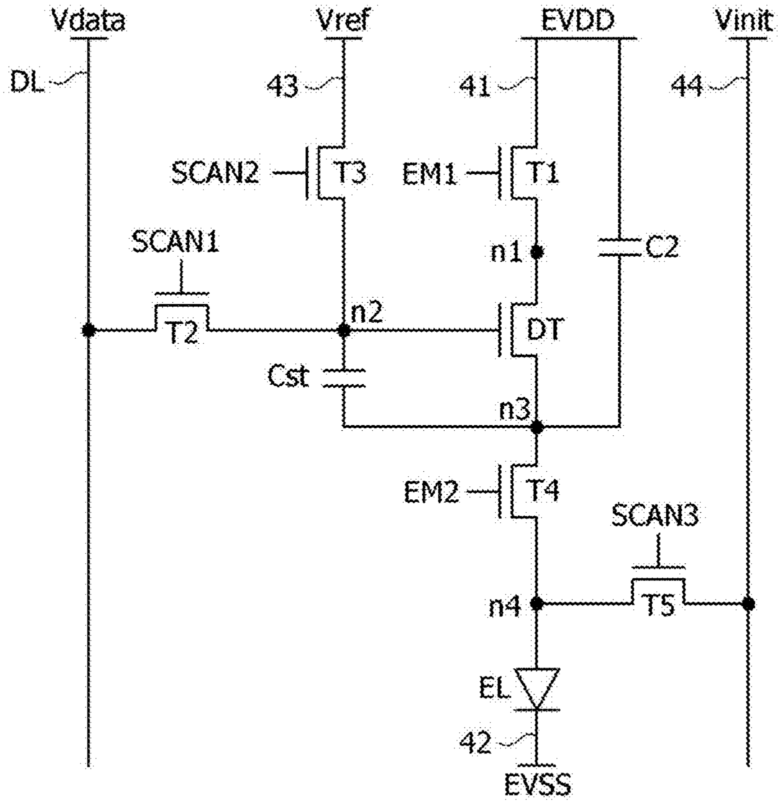
FIG. 3 is an example of a diagram illustrating a pixel circuit according to a first example embodiment of the present disclosure.
Figure 4:
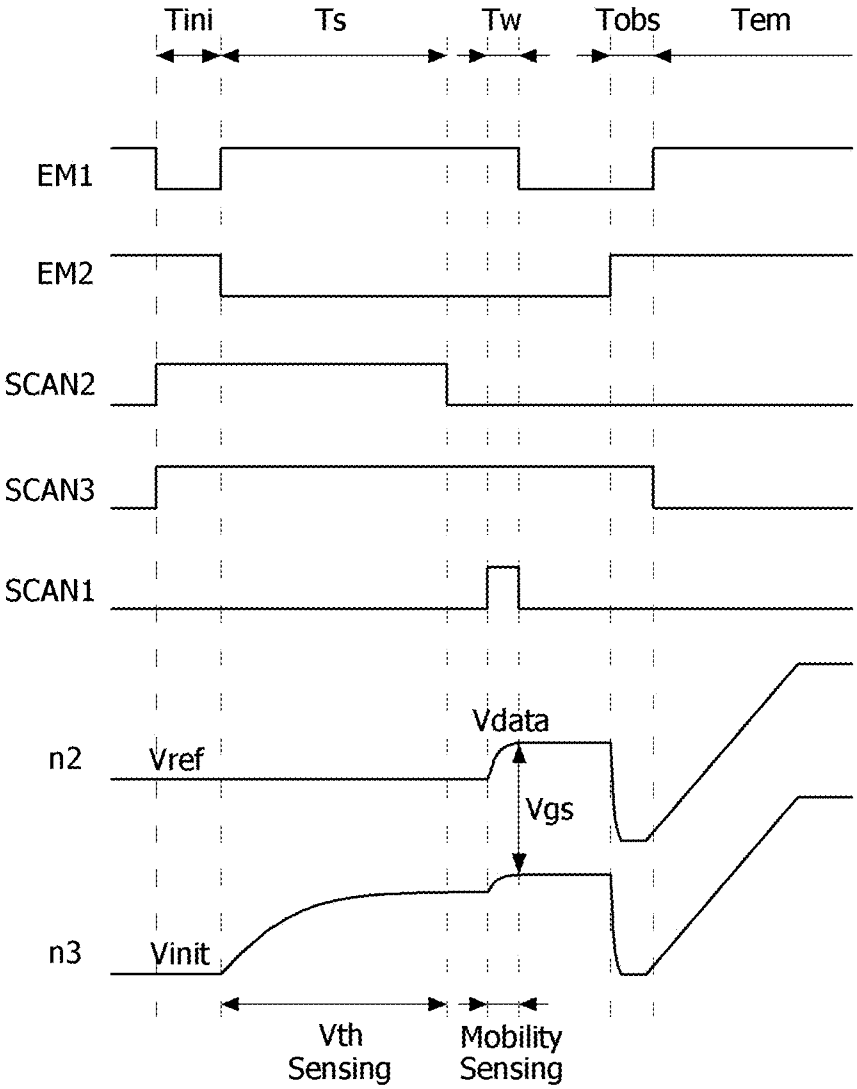
FIG. 4 is an example of a diagram illustrating a driving timing of the pixel circuit shown in FIG. 3.

FIG. 3 is an example of a diagram illustrating a pixel circuit according to a first example embodiment of the present disclosure. FIG. 4 is an example of a diagram illustrating a driving timing of the pixel circuit shown in FIG. 3.

Referring to FIG. 3, the pixel circuit according to the first embodiment of the present disclosure includes a light-emitting element EL, a driving element DT supplying a current to the light-emitting element EL, a plurality of switch elements T1 to T5 switching a current path connected to the driving element DT, a first capacitor Cst storing a gate-source voltage of the driving element DT, and a second capacitor C2. The driving element DT and the switch elements T1 to T7 may be implemented as an N-channel TFT, but are not limited thereto.

The light-emitting element EL emits light by a current applied through the channel of the driving element DT according to a gate-source voltage Vgs of the driving element DT that changes according to a data voltage Vdata. The light-emitting element EL may be implemented as an OLED including an organic compound layer formed between an anode and a cathode. The organic compound layer may include a hole injection layer HIL, a hole transport layer HTL, an emission layer EML, an electron transport layer ETL an electron injection layer EIL, and the like, but is not limited thereto. The anode of the light-emitting element EL is connected to the driving element DT through a fourth node n4, and the cathode of the light-emitting element EL is connected to a pixel base voltage line or a second power line 42 to which a pixel base voltage EVSS is applied.

The OLED used as the light-emitting element EL may have a tandem structure in which a plurality of light-emitting layers are stacked. The OLED having the tandem structure may improve luminance and lifespan of a pixel.

The driving element DT drives the light-emitting element EL by supplying the current to the light-emitting element EL according to the gate-source voltage Vgs. The driving element DT includes a gate electrode connected to a second node n2, a first electrode (or a drain) connected to a first node n1, and a second electrode (or a source) connected to a third node n3.

A first switch element T1 is turned on according to the gate-on voltage of a first EM signal EM1 to supply a pixel driving voltage EVDD to the driving element DT. The first switch element T1 includes a gate electrode to which the first EM signal EM1 is applied, a first electrode connected to a pixel driving voltage line or a first power line 41 to which a pixel driving voltage is applied, and a second electrode connected to the first node n1.

A second switch element T2 is turned on according to the gate-on voltage of a first scan signal SCAN1 to connect a data line DL to the second node n2 to apply the data voltage Vdata. The second switch element T2 includes a gate electrode to which the first scan signal SCAN1 is applied, a first electrode connected to the data line DL, and a second electrode connected to the second node n2.

A third switch element T3 is turned on according to the gate-on voltage of a second scan signal SCAN2 to apply a reference voltage Vref to the second node n2 by connecting a reference voltage line or a third power line 43 thereto. The third switch element T3 includes a gate electrode to which the second scan signal SCAN2 is applied, a first electrode connected to the third power line 43, and a second electrode connected to the second node n2.

A fourth switch element T4 is turned on according to the gate-on voltage of a second EM signal EM2 to connect the third node n3 and the fourth node n4. The fourth switch element T4 includes a gate electrode to which the second EM signal EM2 is applied, a first electrode connected to the third node n3, and a second electrode connected to the fourth node n4.

A fifth switch element T5 is turned on according to the gate-on voltage of a third scan signal SCAN3 to connect an initialization voltage line or a fourth power line 44 to the fourth node n4 to apply the initialization voltage Vinit. The fifth switch element T5 includes a gate electrode to which the third scan signal SCAN3 is applied, a first electrode connected to the fourth node n4, and a second electrode connected to the fourth power line 44.

A first capacitor Cst may be connected between the second node n2 and the third node n3. The first capacitor Cst may charge the gate-source voltage Vgs of the driving element DT.

A second capacitor C2 may be connected between the third node n3 and the first power line 41.

Referring to FIGS. 3 and 4, the pixel circuit according to an example embodiment of the present disclosure may be driven in the order of an initialization step Tini, a sensing step Ts, a data writing step Tw, an OBS step Tobs, and a light emission step Tem.

In the initialization step Tini, the pixel circuit is initialized. The reference voltage Vref initializes the second node n2, and the initialization voltage initializes the third node n3. In the sensing step Ts, a threshold voltage Vth of the driving element DT is sensed and stored in the first capacitor Cst.

In the data writing step Tw, a data voltage Vdata of a pixel data is applied to the second node n2.

In the OBS step OBS, the initialization voltage Vinit is applied to the third node n3 and then initialized. And in the light emission step Tem, after the voltages of the second node n2 and the third node n3 rise, the light-emitting element EL may emit light to a luminance corresponding to a gray value of the pixel data.

Figure 5:
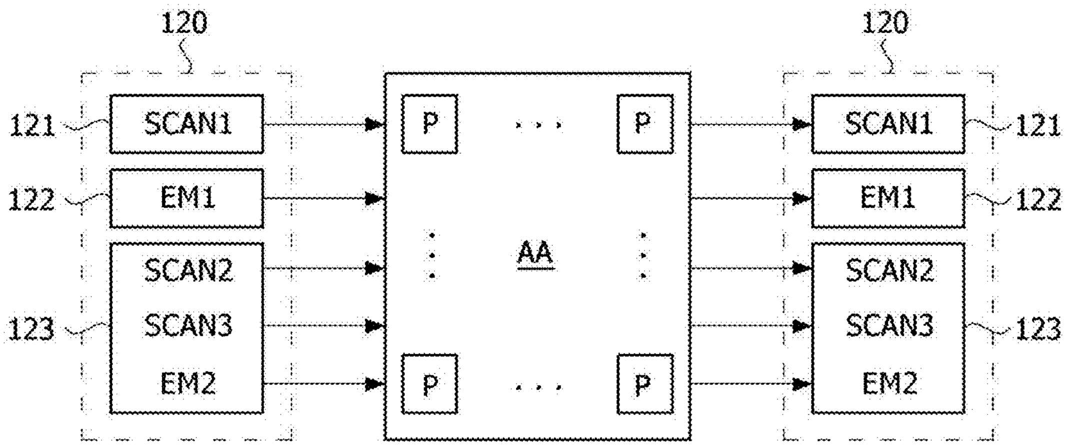
FIG. 5 is a diagram illustrating a configuration of a gate driver according to an example embodiment of the present disclosure.
Figure 6:
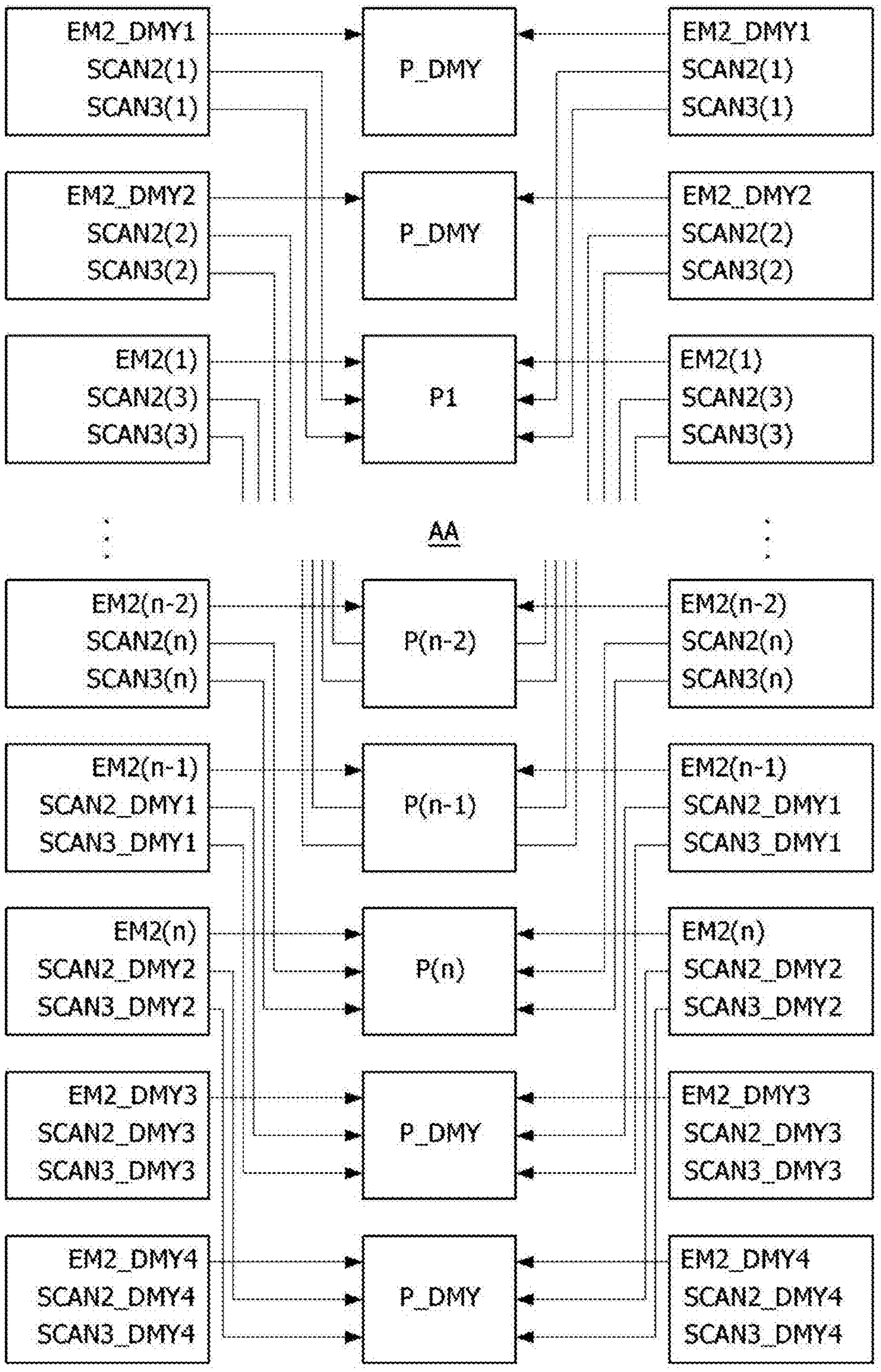
FIG. 6 is an example of a view for explaining a signal application principle of a third gate driver shown in FIG. 5.

FIG. 5 is a diagram illustrating a configuration of a gate driver according to an example embodiment of the present disclosure. FIG. 6 is an example of a view for explaining a signal application principle of a third gate driver shown in FIG. 5.

Since the pixel circuit illustrated in FIG. 3 requires five gate signals, i.e., SCAN1, SCAN2, SCAN3, EM1, and EM2, five individual gate drivers should be configured. In order to reduce a bezel size by reducing the number of gate drivers, an example embodiment configures one gate driver that outputs a plurality of gate signals.

In this case, the gate driver configured to output SCAN1 may be implemented in a shift register type, and the gate driver configured to output SCAN2, SCAN3, EM1, and EM2 may be implemented in an edge trigger type. Accordingly, the same type of SCAN2, SCAN3, and EM2 may be implemented as one gate driver in the example embodiment.

Referring to FIG. 5, the gate driver 120 according to an example embodiment of the present disclosure may be configured to include a first gate driver 121 configured to output a first scan signal SCAN1, a second gate driver 122 configured to output a first EM signal EM1, and a third gate driver 123 configured to output a second scan signal SCAN2, a third scan signal SCAN3, and a second EM signal EM2.

Referring to FIG. 6, the third gate driver 123 according to an example embodiment may apply the second scan signal SCAN2, the third scan signal SCAN3, and the second EM signal EM2 to the pixel circuit.

For example, the third gate driver 123 may apply a second scan signal SCAN2(3), a third scan signal SCAN3(3) and a second EM signal EM2(1) to a first pixel circuit P1.

As another example, the third gate driver 123 may apply a second scan signal SCAN2_DMY2, a third scan signal SCAN3_DMY2, and a second EM signal EM2(*n*) to an (n)th pixel circuit P(n).

Figure 7:
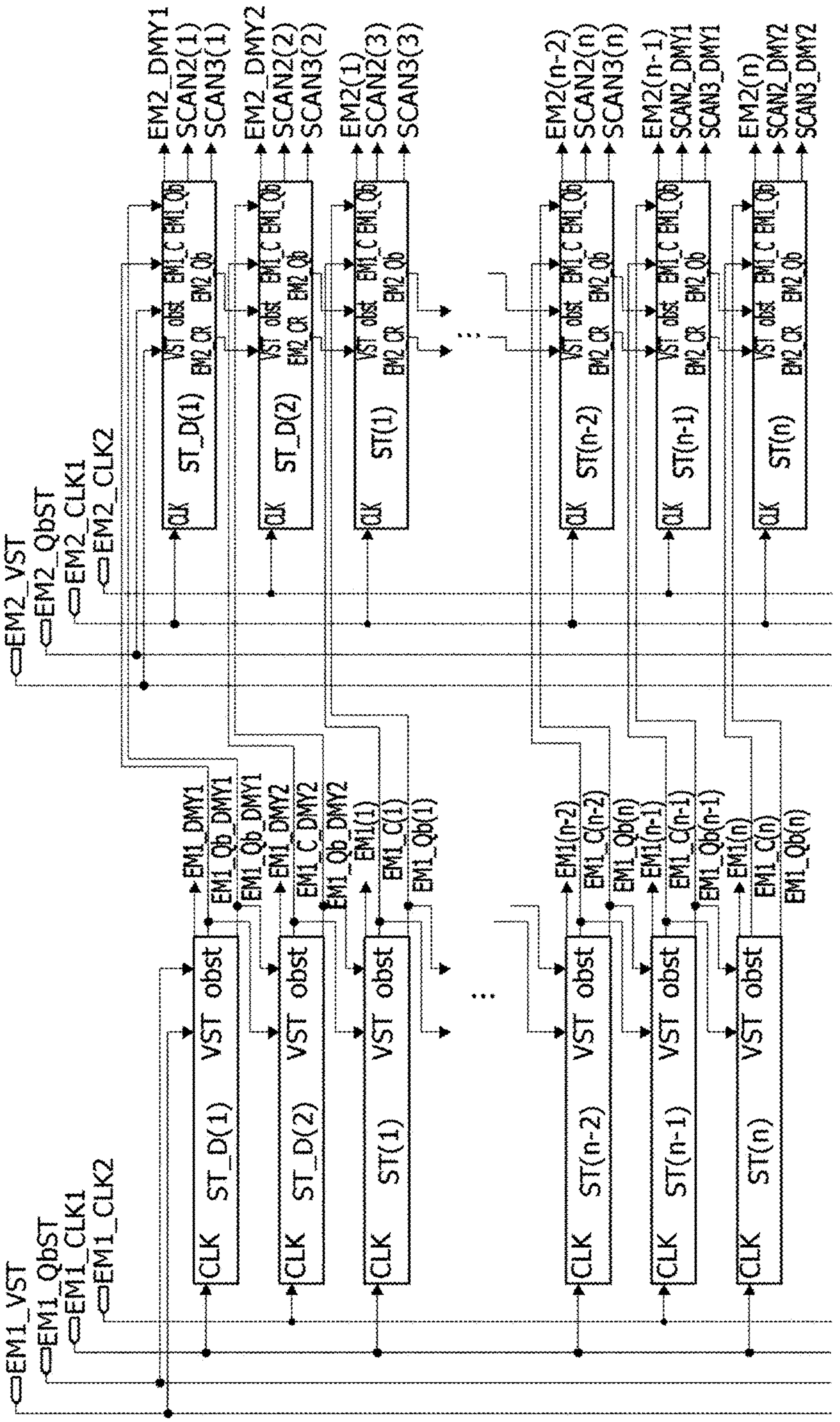
FIG. 7 is a diagram schematically illustrating a shift register of a gate driver according to an example embodiment of the present disclosure.

FIG. 7 is a diagram schematically illustrating a shift register of a gate driver according to an example embodiment of the present disclosure.

Referring to FIG. 7, a gate driver according to an example embodiment includes a shift register that sequentially outputs gate signals in synchronization with a shift clock CLK.

The shift register includes a plurality of signal transfer parts ST_D(1), ST_D(2), ST(1), . . . , ST(n−2), ST(n−1), and ST(n) connected dependently via a carry line through which a carry signal is transmitted.

A start signal VST is generally input to a first signal transfer part. Here, a first dummy signal transfer part ST_D(1) may be the first signal transfer part that receives the start signal VST. In an example, a start signal VST may be referred to as a start pulse VST.

Each of the signal transfer parts ST_D(1), ST_D(2), ST(1), . . . , ST(n−2), ST(n−1), and ST(n) receives a start pulse or a carry signal output from a previous signal transfer part and receive the shift clock CLK. The first signal transfer part ST_D(1) starts to be driven according to the start pulse VST, and other signal transfer parts ST_D(2), ST(1), . . . , ST(n−2), ST(n−1), and ST(n) start to be driven by receiving the carry signal from the previous signal transfer part. For example, as shown in the left portion of FIG. 7, the signal transfer part ST_D(2), may receive a carry signal EM1_Qb_DMY1 from its previous signal transfer part ST_D(1). Similarly, the signal transfer part ST(1) may receive a carry signal EM1_C_DMY2 from its previous signal transfer part ST_D(2). Similarly, the signal transfer part ST(n) may receive a carry signal EM1_C(n−1) from its previous signal transfer part ST(n−1). In a further example, as shown in the right portion of FIG. 7, the signal transfer part ST_D(2) may receive a carry signal EM2_CR from its previous signal transfer part ST_D(1). Similarly, the signal transfer part ST(1) may receive a carry signal EM2_CR from its previous signal transfer part ST_D(2). Similarly, the signal transfer part ST(n) may receive a carry signal EM2_CR from its previous signal transfer part ST(n−1).

The shift clock CLK may be an N phase clock (where N is a positive integer equal to or greater than two). For example, the shift clock CLK may be the two-phase clocks CLK1 and CLK2. The two-phase shift clocks CLK1 and CLK2 have phases opposite to each other.

As shown in the right portion of FIG. 7, each of the signal transfer parts ST(1), . . . , ST(n−2), ST(n−1), and ST(n) may output its respective EM pulse, second scan signal, and third scan signal. For example, the signal transfer part ST(n) may output a first EM pulse EM2(*n*) through a first output node, output a second scan signal SCAN2_DMY2 through a second output node, and output a third scan signal SCAN3_DMY2 through a third output node.

Figure 8:
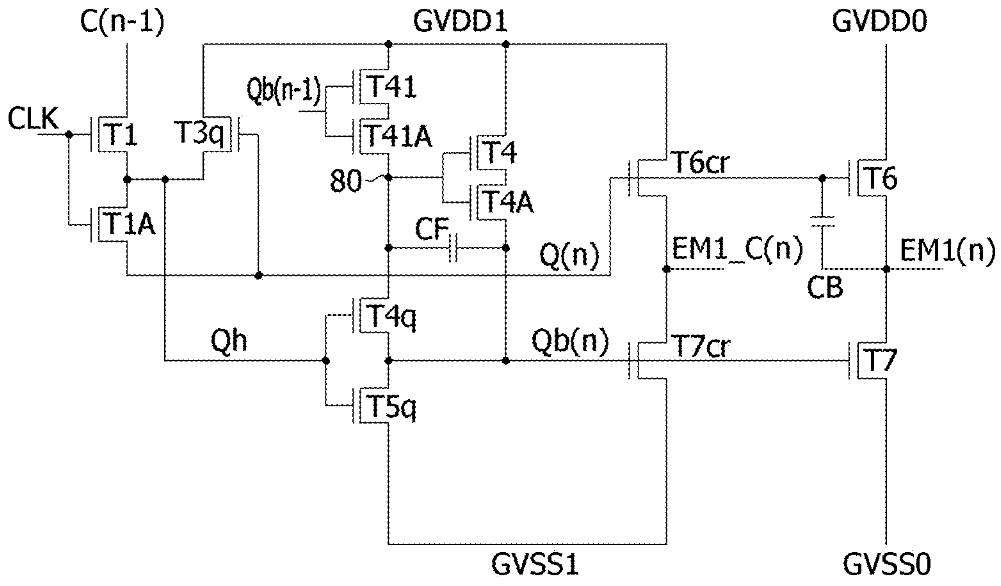
FIG. 8 is a circuit diagram illustrating a first EM driver in detail according to an example embodiment of the present disclosure.
Figure 9:
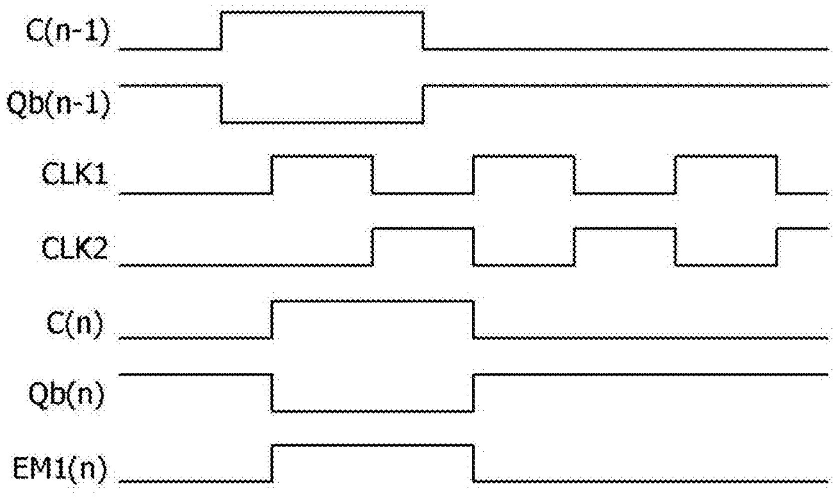
FIG. 9 is an example of a diagram illustrating a driving waveform of the first EM driver illustrated in FIG. 8.

FIG. 8 is a circuit diagram illustrating a first EM driver in detail according to an example embodiment of the present disclosure. FIG. 9 is an example of a diagram illustrating a driving waveform of the first EM driver illustrated in FIG. 8.

Referring to FIGS. 8 and 9, a first EM driver according to an example embodiment may output a first EM signal EM1(*n*) and may include a plurality of transistors T1 to T7.

A first transistor T1 is turned on when the shift clock CLK is a high voltage VGH2 equal to or greater than a gate-on voltage VEH to supply the voltage of a carry signal C(n−1) to a buffer node Qh. The first transistor T1 includes a first electrode connected to an (n−1)th carry signal line C(n−1), a gate electrode to which a shift clock CLK is applied, and a second electrode connected to the buffer node Qh.

A second transistor T1A is turned on when the shift clock CLK is a voltage VGH2 equal to or greater than the gate-on voltage VEH to supply the voltage of a buffer node Qh to a first control node Q(n) to charge the first control node. The second transistor T1A includes a first electrode connected to the buffer node Qh, a gate electrode to which the shift clock CLK is applied, and a second electrode connected to the first control node Q(n).

The first and second transistors T1 and TIA are connected in series. The first and second transistors T1 and TIA are connected in series between the (n−1)th carry signal line C(n−1) and the first control node Q(n).

A third-q transistor T3*q* is turned on when the first control node Q(n) is charged to supply a second high-potential voltage to the buffer node Qh through a second high-potential voltage line GVDD1. The second high-potential voltage is supplied to the buffer node Qh through the second high-potential voltage line. The a third-q transistor T3*q* includes a first electrode connected to the second high-potential voltage line GVDD1, a gate electrode connected to the first control node Q(n), and a second electrode connected to the buffer node Qh.

A fourth-1 transistor T41 and a fourth-1A transistor T41A are turned on when the voltage of a Qb node Qb(n−1) of an (n−1)th signal transfer part ST(n−1) is a high voltage equal to or higher than the gate-on voltage VEH, and supplies the second high-potential voltage to a first node 80 to charge the first node 80 above the gate-on voltage VEH. The fourth-1 transistor T41 includes a first electrode connected to the second high-potential voltage line GVDD1, a gate electrode connected to the Qb node Qb(n−1) of the (n−1)th signal transfer part ST(n−1), and a second electrode connected to the first electrode of the fourth-1A transistor T41A. The fourth-1A transistor T41A includes a first electrode connected to the second electrode of the fourth-1 transistor T41, a gate electrode connected to the Qb node Qb(n−1) of the (n−1)th signal transfer part ST(n−1), and a second electrode connected to the first node 80.

A fourth transistor T4 and a fourth-A transistor T4A are turned on when the voltage of the first node 80 is a high voltage equal to or higher than the gate-on voltage VEH so as to connect the second high-potential voltage line GVDD1 to the Qb node Qb(n), thereby charging the Qb node Qb(n) to the high voltage equal to or higher than the gate-on voltage VEH. The fourth transistor T4 includes a first electrode connected to the second high-potential voltage line GVDD1, a gate electrode connected to the first node 80, and a second electrode connected to the first electrode of the fourth-A transistor T4A. The fourth-A transistor T4A includes a first electrode connected to the second electrode of the fourth transistor T4, a gate electrode connected to the first node 80, and a second electrode connected to the Qb node Qb(n). A first capacitor CF is connected between the gate electrode and the second electrode of the fourth-A transistor T4A. When the fourth-A transistor T4A is turned on by the first capacitor CF, the voltage of the first node 80 may be boosted.

A fourth-q transistor T4*q* is turned on when the voltage of the buffer node Qh is a high voltage equal to or higher than the gate-on voltage VEH to connect the first node 80 to the Qb node Qb(n). The fourth-q transistor T4*q* includes a first electrode connected to the first node 80, a gate electrode connected to the buffer node Qh, and a second electrode connected to the Qb node Qb(n).

A fifth-q transistor T5*q* is turned on when the voltage of the buffer node Qh is a high voltage equal to or higher than the gate-on voltage VEH, and thus connects the Qb node Qb(n) to the second low-potential voltage line GVSS1 to discharge the voltage of the Qb node Qb(n) to a second low-potential voltage. The fifth-q transistor T5*q* includes a first electrode connected to a Qb node Qb(n), a gate electrode connected to a buffer node Qh, and a second electrode connected to a second low-potential voltage line GVSS1.

The first pull-up transistor T6 and a first pull-down transistor T7 charge and discharge the first output node according to the voltages of a Q node Q(n) and the Qb node Qb(n) to output the first EM signal EM1(*n*). The first pull-up transistor T6 includes a gate electrode coupled to the first control node Q(n), a first electrode coupled to a first high-potential voltage line to which a first high-potential voltage is applied, and a second electrode coupled to a first output node. The first pull-down transistor T7 is coupled to the first pull-up transistor T6 with the first output node interposed therebetween. The first pull-down transistor T7 includes a gate electrode coupled to the second control node Qb(n), a first electrode coupled to the first output node, and a second electrode coupled to a first low-potential voltage line GVSS0 to which a first low-potential voltage is applied. A second capacitor CB is connected between the gate electrode and the second electrode of the first pull-up transistor T6. When the first pull-up transistor T6 is turned on by the second capacitor CB, the voltage of the first control node Q(n) may be boosted.

A second pull-up transistor T6*cr* and a second pull-down transistor T7*cr* charge and discharge the second output node according to the voltages of the Q node Q(n) and the Qb node Qb(n) to output the carry signal EM1_C(n) of the first EM driver. The second pull-up transistor T6*cr* includes a gate electrode connected to a Q node Q(n), a first electrode connected to a second high-potential voltage line GVDD1 to which a second high-potential voltage is applied, and a second electrode connected to a second output node. The second pull-down transistor T7*cr* is connected to the second pull-up transistor T6*cr* with the second output node interposed therebetween. The second pull-down transistor T7*cr* includes a gate electrode connected to a Qb node Qb(n), a first electrode connected to the second output node, and a second electrode connected to the second low-potential voltage line GVSS1 to which a second low-potential voltage is applied.

Figure 10:
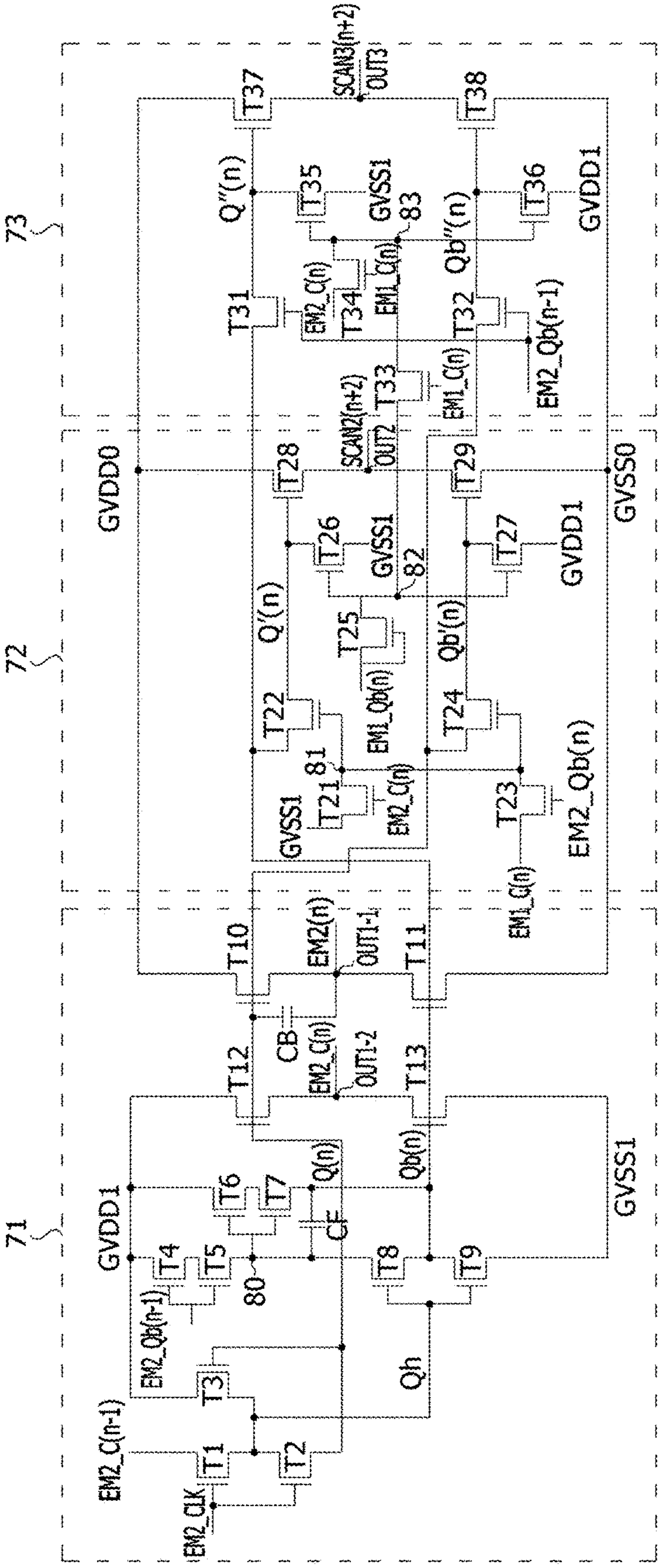
FIG. 10 is a circuit diagram illustrating a gate driver in detail according to an example embodiment of the present disclosure.

FIG. 10 is a circuit diagram illustrating a gate driver in detail according to an example embodiment of the present disclosure.

Referring to FIG. 10, the gate driver according to an example embodiment includes a first output circuit part 71 configured to output a first gate signal, a second output circuit part 72 configured to output a second gate signal, and a third output circuit part 73 configured to output a third gate signal.

The first output circuit part 71 may output a first gate signal, for example, a second EM signal EM2(*n*). The first output circuit part 71 includes first-1 to first-13 transistors T1 to T13.

The first-1 transistor T1 is turned on when the shift clock CLK is a high voltage VGH2 equal to or greater than the gate-on voltage VEH to supply the voltage of the (n−1)th carry signal line C(n−1) of the previous signal transfer part to the buffer node Qh. The first-1 transistor T1 includes a first electrode connected to the (n−1)th carry signal line C(n−1), a gate electrode to which the shift clock CLK is applied, and a second electrode connected to the buffer node Qh.

When the shift clock CLK is the voltage VGH2 equal to or greater than the gate-on voltage VEH, the first-2 transistor T2 is turned on to supply the voltage of the buffer node Qh to the first control node Q(n) to charge the first control node. The first-2 transistor T2 includes a first electrode connected to the buffer node Qh, a gate electrode to which the shift clock CLK is applied, and a second electrode connected to the first control node Q(n).

The first-1 and first-2 transistors T1 and T2 are connected in series. The first-1 and first-2 transistors T1 and T2 are connected in series between the (n−1)th carry signal line C(n−1) and the first control node Q(n).

The first-3 transistor T3 is turned on when the first control node Q(n) is charged to supply the second high-potential voltage to the buffer node Qh through the second high-potential voltage line GVDD1. The second high-potential voltage is supplied to the buffer node Qh through the second high-potential voltage line GVDD1. The first-3 transistor T3 includes a first electrode connected to the second high-potential voltage line GVDD1, a gate electrode connected to the first control node Q(n), and a second electrode connected to the buffer node Qh.

When the voltage of a first-2 control node Qb(n−1) of the (n−1)th signal transfer part ST(n−1) is a high voltage equal to or higher than the gate-on voltage VEH, the first-4 transistor T4 and the first-5 transistor T5 are turned on to supply the second high-potential voltage to the first node 80 to charge the first node 80 above the gate-on voltage VEH. The first-4 transistor T4 includes a first electrode connected to the second high-potential voltage line GVDD1, a gate electrode connected to the first-2 control node Qb(n−1) of the (n−1)th signal transfer part ST(n−1), and a second electrode connected to a first electrode of the first-5 transistor T5. The first-5 transistor T5 includes a first electrode connected to the second electrode of the first-4 transistor T4, a gate electrode connected to the first-2 control node Qb(n−1) of the (n−1)th signal transfer part ST(n−1), and the second electrode connected to the first node 80.

When the voltage of the first node 80 is a high voltage equal to or higher than the gate-on voltage VEH, the first-6 transistor T6 and the first-7 transistor T7 are turned on to connect the second high-potential voltage line GVDD1 to the first-2 control node Qb(n), thereby charging the first-2 control node Qb(n) to a high voltage equal to or higher than the gate-on voltage VEH. The first-6 transistor T6 includes a first electrode connected to the second high-potential voltage line GVDD1, a gate electrode connected to the first node 80, and a second electrode connected to the first electrode of the first-7 transistor T7. The first-7 transistor T7 includes a first electrode connected to the second electrode of the first-6 transistor T6, a gate electrode connected to the first node 80, and the second electrode connected to the Qb node Qb(n). A first capacitor CF is connected between the gate electrode and the second electrode of the first-7 transistor T7. When the first-7 transistor T7 is turned on by the first capacitor CF, the voltage of the first node 80 may be boosted.

The first-8 transistor T8 is turned on when the voltage of the buffer node Qh is a high voltage equal to or higher than the gate-on voltage VEH to connect the first node 80 to the first-2 control node Qb(n). The first-8 transistor T8 includes a first electrode connected to the first node 80, a gate electrode connected to the buffer node Qh, and a second electrode connected to the first-2 control node Qb(n).

When the voltage of the buffer node Qh is a high voltage equal to or higher than the gate-on voltage VEH, the first-9 transistor T9 is turned on to connect the first-2 control node Qb(n) to the second low-potential voltage line GVSS1, thereby discharging the voltage of the first-2 control node Qb(n) to a second low-potential voltage. The first-9 transistor T9 includes a first electrode connected to the first-2 control node Qb(n), a gate electrode connected to the buffer node Qh, and a second electrode connected to the second low-potential voltage line GVSS1.

A first-10 transistor or first-1 pull-up transistor T10 and a first-11 transistor or first-1 pull-down transistor T11 charge and discharge the first-1 output node OUT1-1 according to the voltages of the Q node Q(n) and the Qb node Qb(n) to output a second gate signal, e.g., a second EM signal EM2(*n*). The first-1 pull-up transistor T10 includes a gate electrode connected to the first control node Q(n), a first electrode connected to the first high-potential voltage line GVDD0 to which the first high-potential voltage is applied, and a second electrode connected to the first-1 output node OUT1-1. The first-1 pull-down transistor T11 is connected to the first-1 pull-up transistor T10 with the first-1 output node OUT1-1 interposed therebetween. The first-1 pull-down transistor T11 includes a gate electrode connected to a second control node Qb(n), a first electrode connected to the first-1 output node OUT1-1, and a second electrode connected to the first low-potential voltage line GVSS0 to which the first low-potential voltage is applied. A second capacitor CB is connected between the gate electrode and the second electrode of the first-1 pull-up transistor T10. When the first-1 pull-up transistor T10 is turned on by the second capacitor CB, the voltage of the first control node Q(n) may be boosted.

A first-12 transistor or first-2 pull-up transistor T12 and a first-13 transistor or first-2 pull-down transistor T13 charge and discharge the first-2 output node OUT1-2 according to the voltages of the first-1 control node Q(n) and the first-2 control node Qb(n) to output a carry signal EM2_C(n). The first-2 pull-up transistor T12 includes a gate electrode connected to the first-1 control node Q(n), a first electrode connected to the second high-potential voltage line GVDD1 to which a second high-potential voltage is applied, and a second electrode connected to the first-2 output node OUT1-2. The first-2 pull-down transistor T13 is connected to the first-2 pull-up transistor T12 with the first-2 output node OUT1-2 interposed therebetween. The first-2 pull-down transistor T13 includes a gate electrode connected to the first-2 control node Qb(n), a first electrode connected to the first-2 output node OUT1-2, and a second electrode connected to the second low-potential voltage line GVSS1 to which a second low-potential voltage is applied.

The second output circuit part 72 may output a second gate signal, for example, a second SCAN signal SCAN2(*n*+2). The second output circuit part 72 includes second-1 to second-9 transistors T21 to T29.

The second-1 transistor T21 connects the second low-potential voltage line GVSS1 to the second-1 node 81 according to the voltage of the carry signal line EM2_C(n) of the first output circuit part 71 to discharge it to the second low-potential voltage. The second-1 transistor T21 includes a gate electrode connected to the carry signal line EM2_C(n), a first electrode connected to the second low-potential voltage line GVSS1, and a second electrode connected to the second-1 node 81.

The second-2 transistor T22 connects the first-2 control node Qb(n) of the first output circuit part 71 to the second-1 control node Q'(n) according to the voltage of the second-1 node 81. The second-2 transistor T22 includes a gate electrode connected to the second-1 node 81, a first electrode connected to the first-2 control node Qb(n) of the first output circuit part 71, and a second electrode connected to the second-1 control node Q'(n).

The second-3 transistor T23 connects the carry signal line EM1_C(n) of the first EM driver to the second-1 node 81 according to the voltage of the first-2 control node Qb(n) of the first output circuit part 71. The second-3 transistor T23 includes a gate electrode connected to the first-2 control node Qb(n) of the first output circuit part 71 (see EM2_Qb (n)), a first electrode connected to the carry signal line EM1_C(n) of the first EM driver, and a second electrode connected to the second-1 node 81.

The second-4 transistor T24 connects the first-1 control node Q(n) of the first output circuit part 71 to the second-2 control node Qb'(n) according to the voltage of the second-1 node 81. The second-4 transistor T24 includes a gate electrode connected to the second-1 node 81, a first electrode connected to the first-1 control node Q(n) of the first output circuit part 71, and a second electrode connected to the second-2 control node Qb'(n).

The second-5 transistor T25 connects the second control node Qb(n) of the first EM driver to the second-2 node 82 according to the voltage of the second control node Qb(n) of the first EM driver. The second-5 transistor T25 includes a gate electrode and a first electrode connected to the second control node Qb(n) of the first EM driver, and a second electrode connected to the second-2 node 82.

The second-6 transistor T26 discharges the second-1 control node Q'(n) to a second low-potential voltage according to the voltage of the second-2 node 82. The second-6 transistor T26 includes a gate electrode connected to the second-2 node 82, a first electrode connected to the second-1 control node Q'(n), and a second electrode connected to the second low-potential voltage line GVSS1.

The second-7 transistor T27 charges the second-2 control node Qb'(n) with the second high-potential voltage according to the voltage of the second-2 node 82. The second-7 transistor T27 includes a gate electrode connected to the second-2 node 82, a first electrode connected to the second-2 control node Qb'(n), and a second electrode connected to the second high-potential voltage line GVDD1.

The second-8 transistor or second pull-up transistor T28 and the second-9 transistor or second pull-down transistor T29 charge and discharge the second output node OUT2 according to the voltages of the second-1 control node Q'(n) and the second-2 control node Qb'(n) to output a second gate signal, for example, a second SCAN signal SCAN2(*n*+2). The second pull-up transistor T28 includes a gate electrode connected to the second-1 control node Q'(n), a first electrode connected to the first high-potential voltage line GVDD0 to which the first high-potential voltage is applied, and a second electrode connected to the second output node. The second pull-down transistor T29 is connected to the second pull-up transistor T28 with the second output node OUT2 interposed therebetween. The second pull-down transistor T29 includes a gate electrode connected to the second-2 control node Qb'(n), a first electrode connected to the second output node OUT2, and a second electrode connected to the first low-potential voltage line GVSS0 to which the first low-potential voltage is applied.

The third output circuit part 73 may output a third gate signal, for example, a third SCAN signal SCAN3(*n*+3). The third output circuit part 73 includes third-1 to third-8 transistors T31 to T38.

The third-1 transistor T31 connects the first-2 control node Qb(n) of the first output circuit part 71 to the third-1 control node Q"(n) according to the voltage of the first-2 control node Qb(n−1) of the (n−1)th signal transfer part ST(n−1). The third-1 transistor T31 includes a gate electrode connected to the first-2 control node Qb(n−1) of the (n−1)th signal transfer part ST(n−1), a first electrode connected to the first-2 control node Qb(n) of the first output circuit part 71, and a second electrode connected to the third-1 control node Q"(n).

The third-2 transistor T32 connects the first-1 control node Q(n) to the third-2 control node Qb"(n) according to the voltage of the first-2 control node Qb(n−1) of the (n−1)th signal transfer part ST(n−1). The third-2 transistor T32 includes a gate electrode connected to the first-2 control node Qb(n−1) of the (n−1)th signal transfer part ST(n−1), a first electrode connected to the first-1 control node Q(n), and a second electrode connected to the third-2 control node Qb"(n).

The third-3 transistor T33 connects the second-2 node 82 to the second-3 node 83 according to the voltage of the carry signal line EM1_C(n) of the first EM driver. The third-3 transistor T33 includes a gate electrode connected to the carry signal line EM1_C(n) of the first EM driver, a first electrode connected to the second-2 node 82, and a second electrode connected to the second-3 node 83.

The third-4 transistor T34 connects the carry signal line EM2_C(n) to the second-3 node 83 according to the voltage of the carry signal line EM1_C(n) of the first EM driver. The third-4 transistor T34 includes a gate electrode connected to the carry signal line EM1_C(n) of the first EM driver, a first electrode connected to the carry signal line EM2_C(n), and a second electrode connected to the second-3 node 83.

The third-5 transistor T35 discharges the third-1 control node Q"(n) to a second low-potential voltage depending on the voltage of the second-3 node 83. The third-5 transistor T35 includes a gate electrode connected to the second-3 node 83, a first electrode connected to the third-1 control node Q"(n), and a second electrode connected to the second low-potential voltage line GVSS1.

The third-6 transistor T36 charges the third-2 control node Qb"(n) with the second high-potential voltage according to the voltage of the second-3 node 83. The third-6 transistor T36 includes a gate electrode connected to the second-3 node 83, a first electrode connected to the third-2 control node Qb"(n), and a second electrode connected to the second high-potential voltage line GVDD1.

The third-7 transistor or third pull-up transistor T37 and the third-8 transistor or third pull-down transistor T38 charge and discharge the third output node OUT3 according to the voltages of the third-1 control node Q"(n) and the third-2 control node Qb"(n) to output a third gate signal, e.g., a third SCAN signal SCAN3(*n*+3). The third pull-up transistor T37 includes a gate electrode connected to the third-1 control node Q"(n), a first electrode connected to the first high-potential voltage line GVDD0 to which the first high-potential voltage is applied, and a second electrode connected to the third output node OUT3. The third pull-down transistor T38 is connected to the third pull-up transistor T37 with the third output node OUT3 interposed therebetween. The third pull-down transistor T38 includes a gate electrode connected to the third-2 control node Qb"(n), a first electrode connected to the third output node OUT3, and a second electrode connected to the first low-potential voltage line GVSS0 to which the first low-potential voltage is applied.

Figure 11:
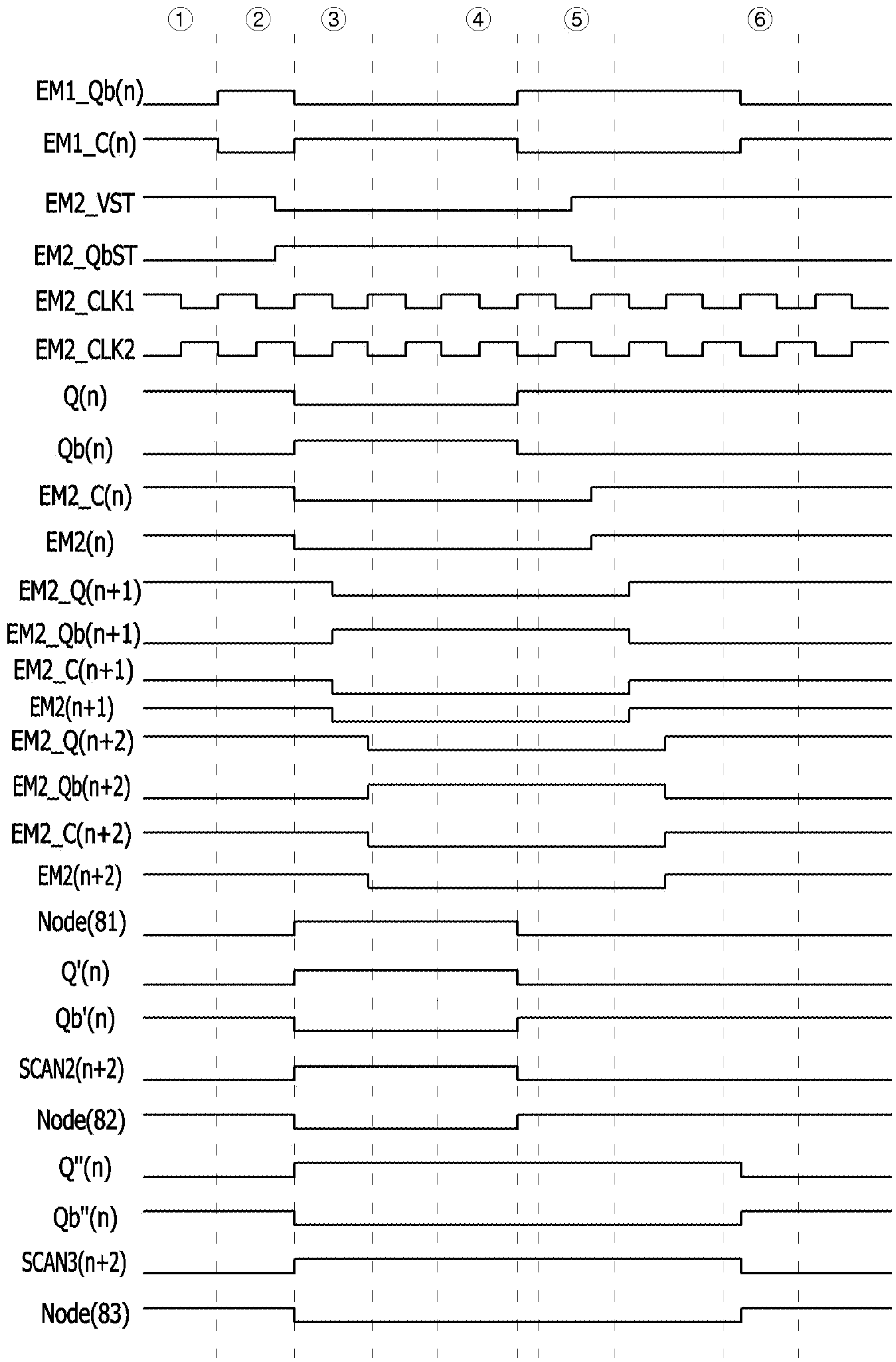
FIG. 11 is an example of a diagram illustrating a driving waveform of the gate driver illustrated in FIG. 10.

FIG. 11 is an example of a diagram illustrating a driving waveform of the gate driver illustrated in FIG. 10. FIGS. 12 to 17 are examples of diagrams for explaining an operation principle of the gate driver according to FIG. 11.

Figure 12:
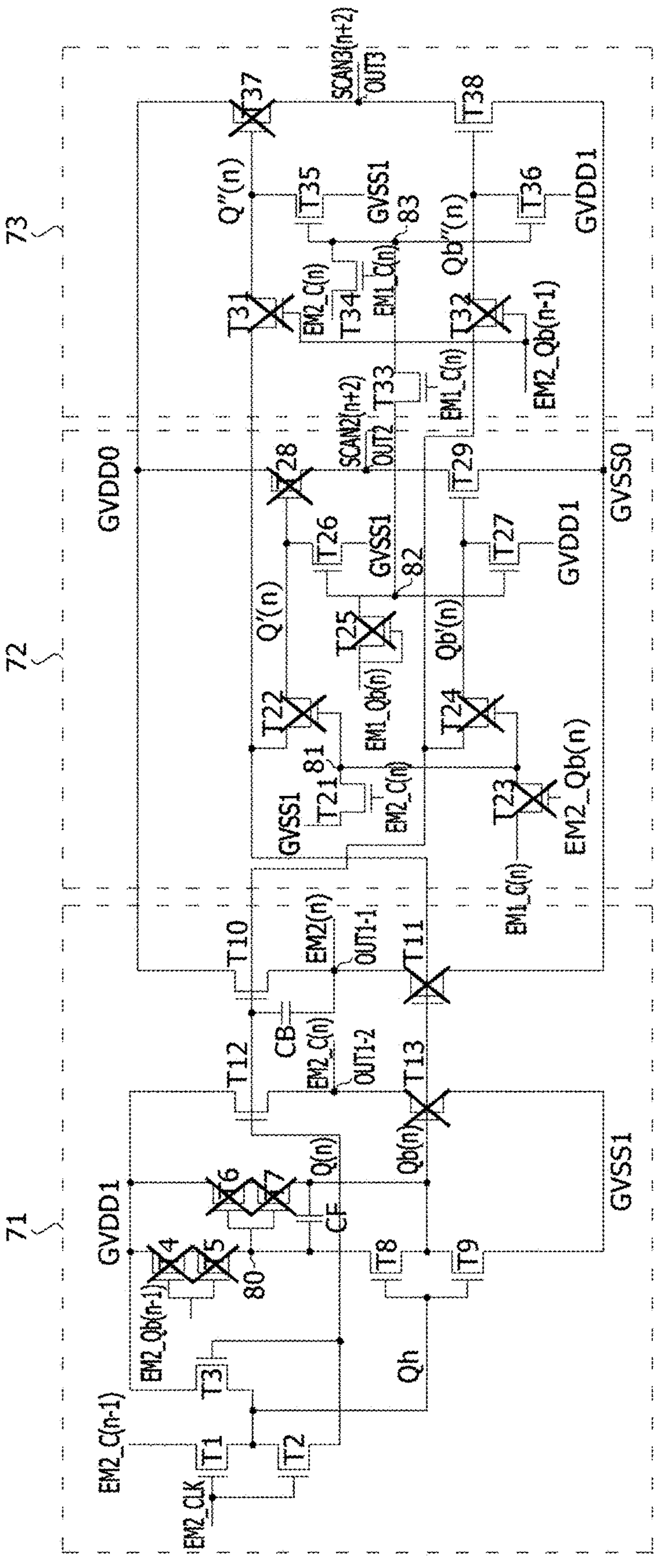
FIGS. 12 to 17 are examples of diagrams for explaining an operation principle of the gate driver according to FIG. 11.

Referring to FIGS. 11 and 12, in an interval ①, the first-1 control node Q(n) of the first output circuit part becomes the high voltage, and the first-2 control node Qb(n) becomes the low voltage, so that the first-1 carry signal and the first gate signal output the high voltage.

The second-1 control node Q'(n) of the second output circuit part becomes the low voltage, and the second-2 control node Qb'(n) becomes the high voltage, so that the second gate signal outputs the low voltage.

The third-1 control node Q"(n) of the third output circuit part becomes the low voltage, and the third-2 control node Qb"(n) becomes the high voltage, so that the third gate signal outputs the low voltage.

Figure 13:
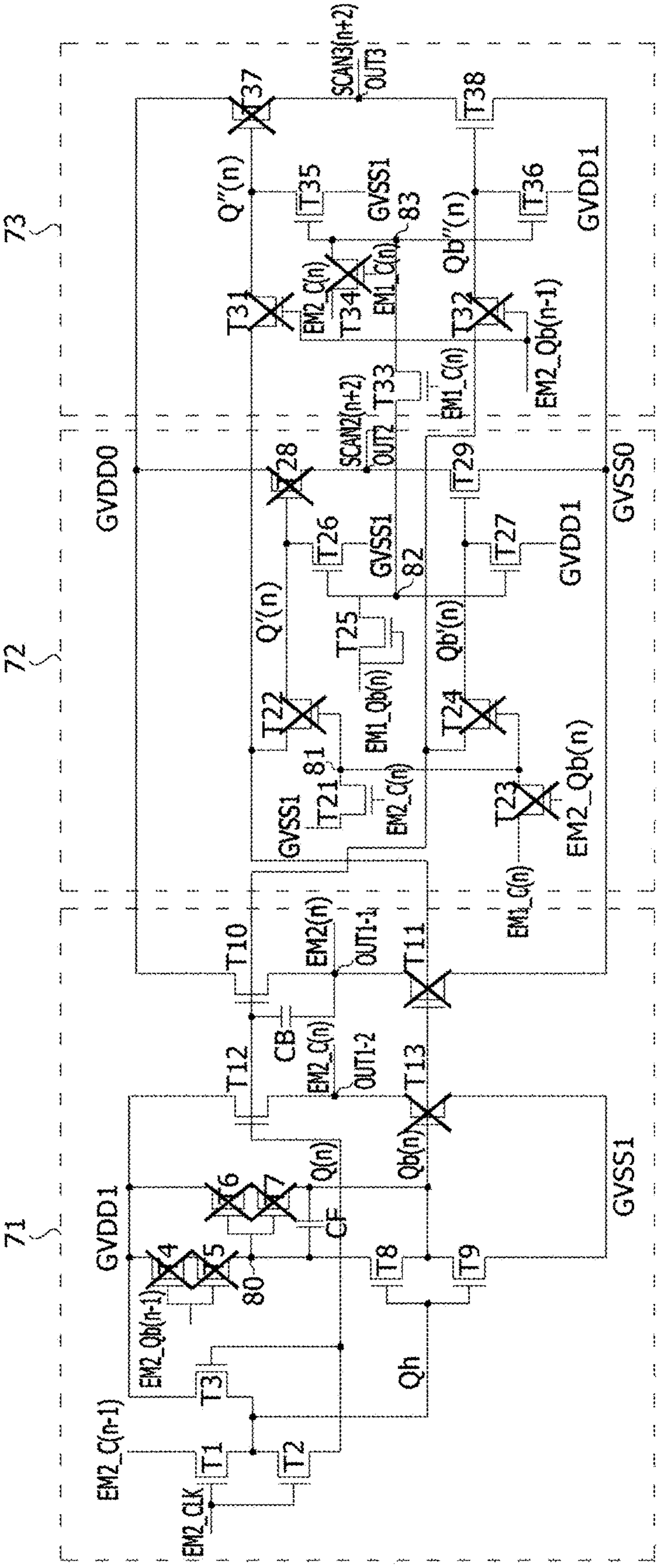

Referring to FIGS. 11 and 13, in an interval ②, the first-1 control node Q(n) of the first output circuit part maintains a high voltage, and the first-2 control node Qb(n) maintains a low voltage, so that the first-1 carry signal and the first gate signal maintain a high voltage.

The second-1 control node Q'(n) of the second output circuit part becomes the low voltage, and the second-2 control node Qb'(n) becomes the high voltage, so that the second gate signal maintains the low voltage.

The third-1 control node Q"(n) of the third output circuit part becomes the low voltage, and the third-2 control node Qb"(n) becomes the high voltage, so that the third gate signal maintains the low voltage.

Figure 14:
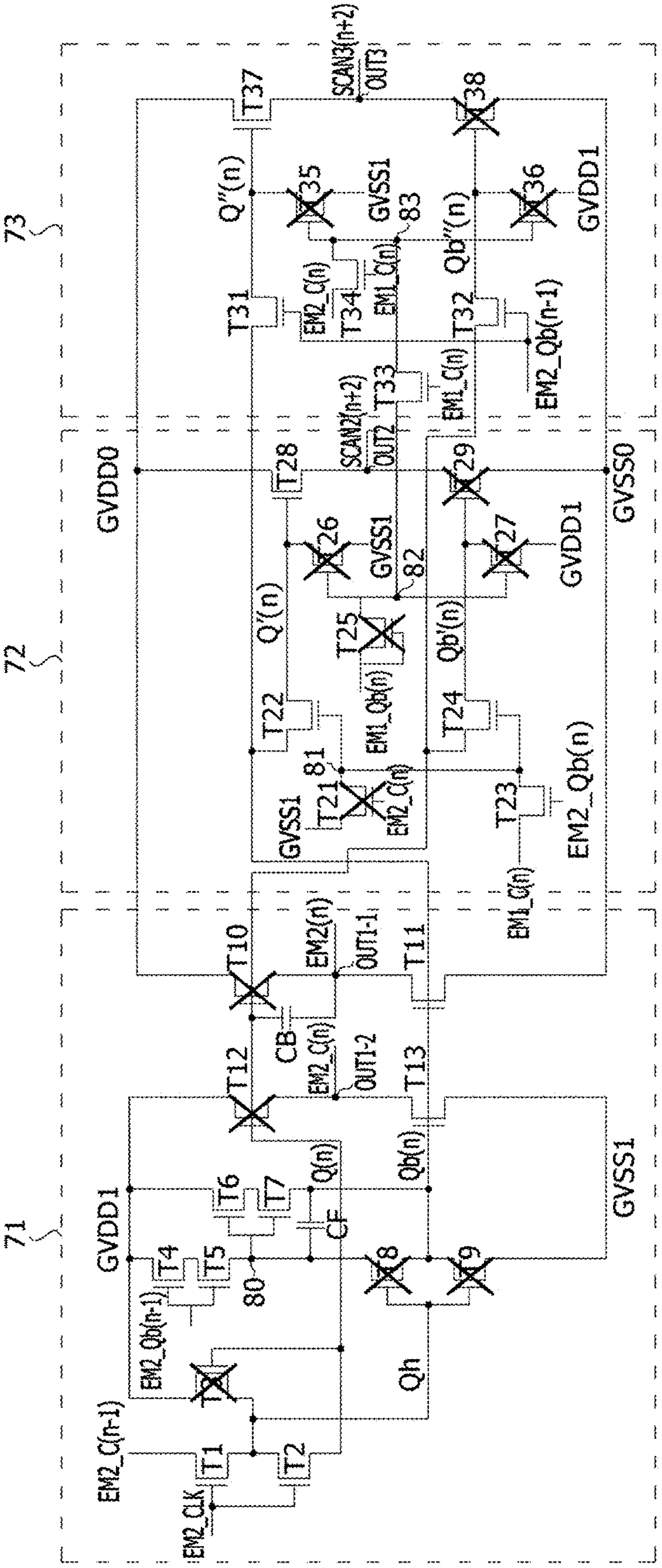

Referring to FIGS. 11 and 14, in an interval ③, the first-1 control node Q(n) of the first output circuit part becomes the low voltage, and the first-2 control node Qb(n) becomes the high voltage, so that the first-1 carry signal and the first gate signal output the low voltage.

The second-1 control node Q'(n) of the second output circuit part becomes the high voltage, and the second-2 control node Qb'(n) becomes the low voltage, so that the second gate signal outputs the high voltage.

The third-1 control node Q"(n) of the third output circuit part becomes the high voltage, and the third-2 control node Qb"(n) becomes the low voltage, so that the third gate signal outputs the high voltage.

Figure 15:
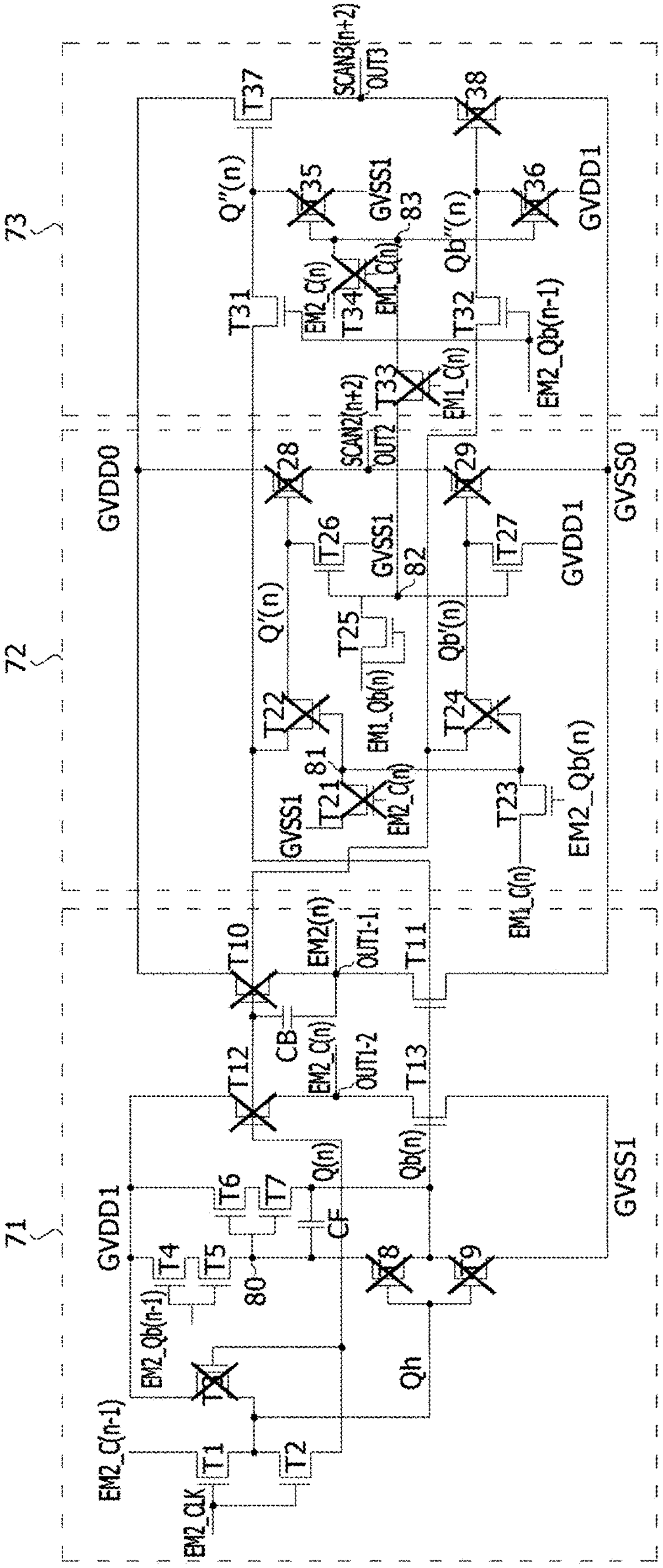

Referring to FIGS. 11 and 15, in an interval ④, the first-1 control node Q(n) of the first output circuit part maintains the low voltage, and the first-2 control node Qb(n) maintains the high voltage, so that the first-1 carry signal and the first gate signal maintain the low voltage.

The second-1 control node Q'(n) of the second output circuit part becomes a low voltage, and the second-2 control node Qb'(n) becomes a high voltage, so that the second gate signal outputs a low voltage.

The third-1 control node Q"(n) of the third output circuit part becomes the high voltage, and the third-2 control node Qb"(n) becomes the low voltage, so that the third gate signal maintains the high voltage.

Figure 16:
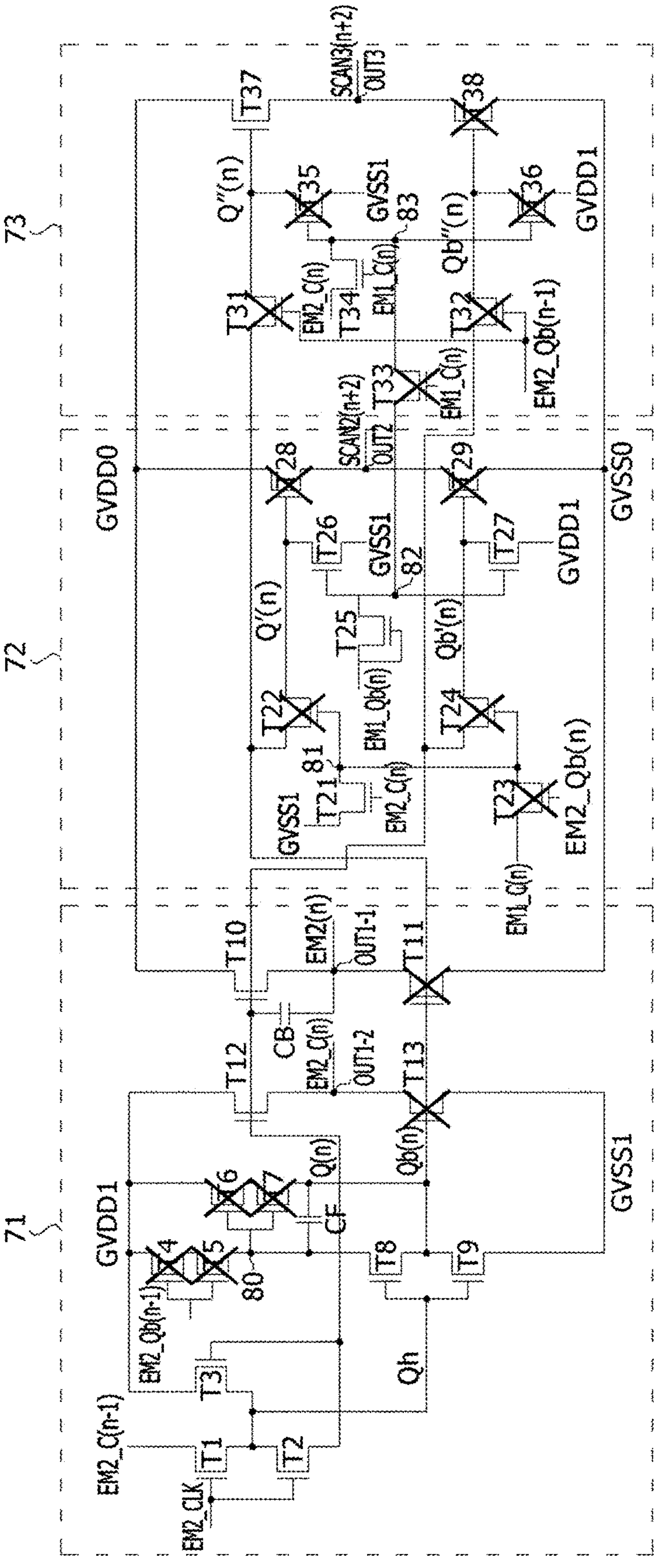

Referring to FIGS. 11 and 16, in an interval ⑤, the first-1 control node Q(n) of the first output circuit part becomes a high voltage, and the first-2 control node Qb(n) becomes a low voltage, so that the first-1 carry signal and the first gate signal output a high voltage.

The second-1 control node Q'(n) of the second output circuit part becomes the low voltage, and the second-2 control node Qb'(n) becomes the high voltage, so that the second gate signal maintains the low voltage.

The third-1 control node Q"(n) of the third output circuit part maintains a high voltage, and the third-2 control node Qb"(n) maintains a low voltage, so that the third gate signal maintains a high voltage.

Figure 17:
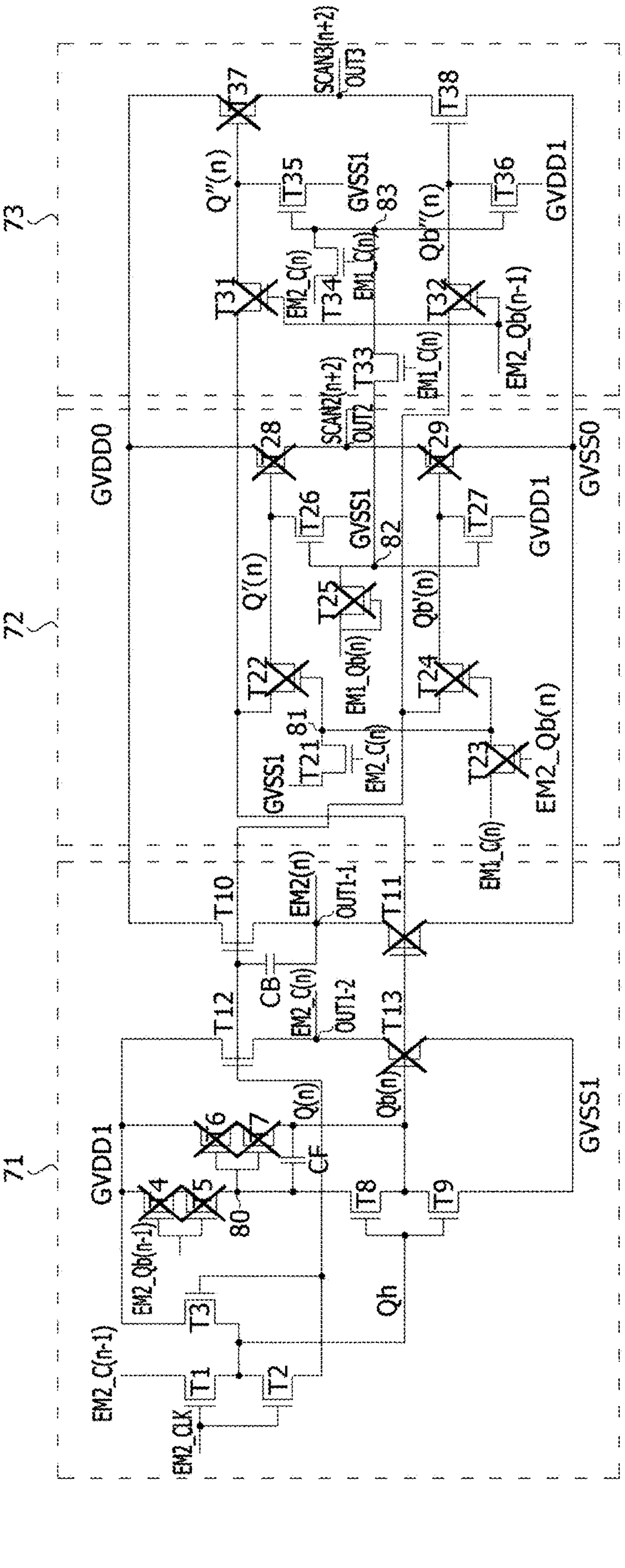

Referring to FIGS. 11 and 17, in an interval 6, the first-1 control node Q(n) of the first output circuit part maintains a high voltage, and the first-2 control node Qb(n) maintains a low voltage, so that the first-1 carry signal and the first gate signal maintain a high voltage.

The second-1 control node Q'(n) of the second output circuit part becomes the low voltage, and the second-2 control node Qb'(n) becomes the high voltage, so that the second gate signal maintains the low voltage.

The third-1 control node Q"(n) of the third output circuit part becomes the low voltage, and the third-2 control node Qb"(n) becomes the high voltage, so that the third gate signal outputs the low voltage.

Figure 18:
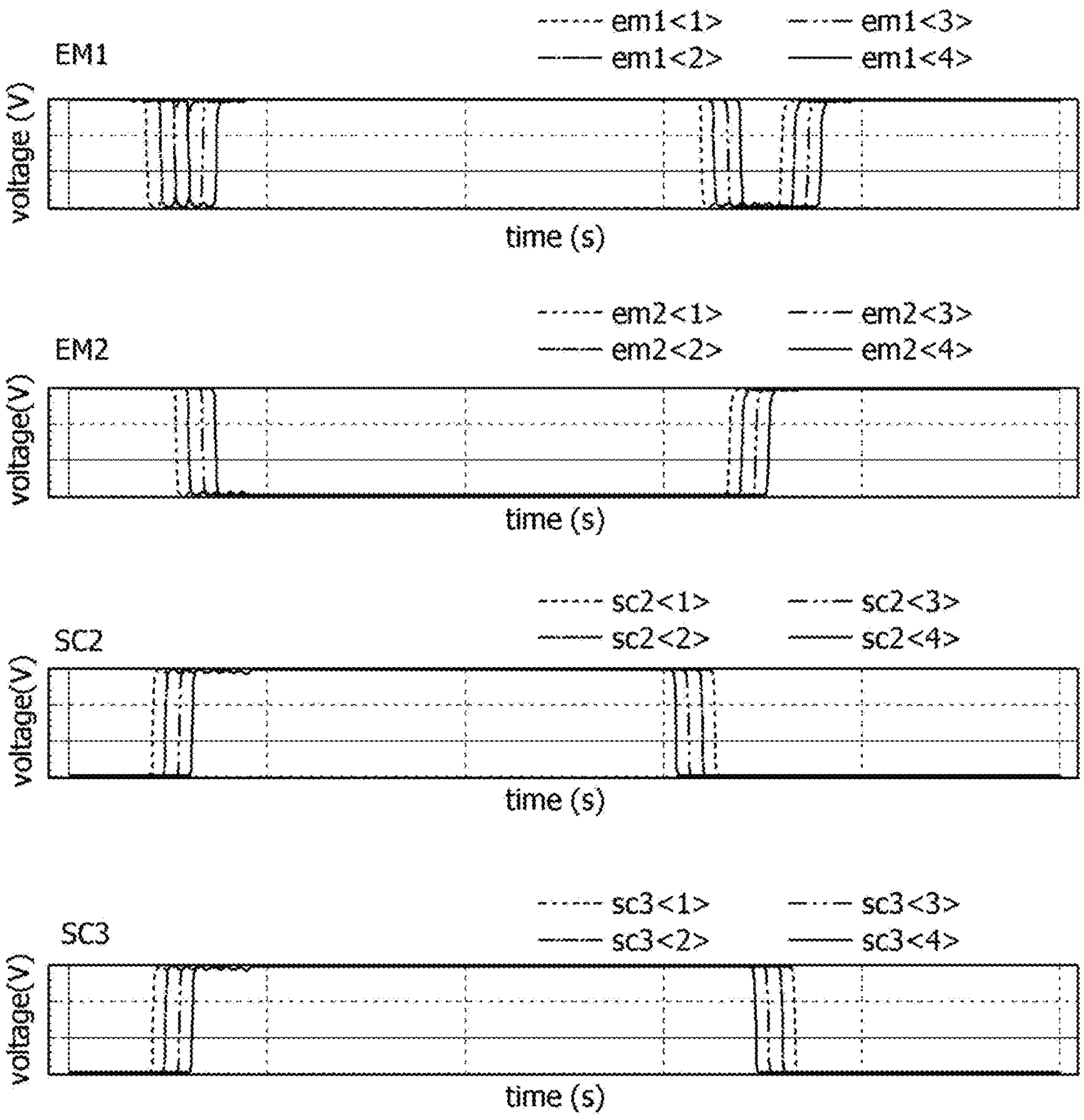
FIG. 18 is a diagram illustrating a simulation result of a gate driver according to an example embodiment.

FIG. 18 is a diagram illustrating a simulation result of a gate driver according to an example embodiment.

Referring to FIG. 18, output waveforms of a first EM signal EM1(*n*), a second EM signal EM2(*n*), a second scan signal SCAN2(*n*), and a third scan signal SCAN3(*n*) of each of the first EM driver, the second EM driver, the second scan driver, and the third scan driver according to an example embodiment are shown.

Without limiting the scope of the present disclosure or the claims, the following example relationships among FIGS. 6, 7, 8, 10 and 18 are provided below by way of illustration.

With respect to FIGS. 6 and 7, in an example, the signals EM2_DMY1, EM2_DMY2, EM2(1), EM2(*n*−2), EM2(*n*−1), and EM2(*n*) of FIG. 7 may correspond to the signals EM2_DMY1, EM2_DMY2, EM2(1), EM2(*n*−2), EM2(*n*−1), and EM2(*n*) of FIG. 6. Similarly, the signals SCAN2(1), SCAN2(2), SCAN2(3), SCAN2(*n*), SCAN2_DMY1, and SCAN2_DMY2 of FIG. 7 may correspond to the signals SCAN2(1), SCAN2(2), SCAN2(3), SCAN2(*n*), SCAN2_DMY1, and SCAN2)_DMY2 of FIG. 6. Similarly, the signals SCAN3(1), SCAN3(2), SCAN3(3), SCAN3(*n*), SCAN3_DMY1, and SCAN3_DMY2 of FIG. 7 may correspond to the signals SCAN3(1), SCAN3(2), SCAN3(3), SCAN3(*n*), SCAN3_DMY1, and SCAN3)_DMY2 of FIG. 6.

With respect to FIGS. 7 and 8, in an example, the first EM driver of FIG. 8 may correspond to a portion of the signal transfer part ST(n) shown in the left portion of FIG. 7. The shift clock CLK described above for FIG. 8 may correspond to the shift clock CLK of the signal transfer part ST(n) shown in the left portion of FIG. 7. The first EM signal EM1(*n*) of FIG. 8 may correspond to the first EM signal EM1(*n*) of the signal transfer part ST(n) shown in the left portion of FIG. 7. The carry signal EM1_C(n) of FIG. 8 may correspond to a carry signal EM1_C(n) of the signal transfer part ST(n) shown in the left portion of FIG. 7.

With respect to FIGS. 7, 8 and 10, in an example, the gate driver of FIG. 10 may correspond to, or may be included in, the signal transfer part ST(n) shown in the right portion of FIG. 7. The shift clock CLK described above for FIG. 10 may correspond to the shift clock EM2_CLK of FIG. 10, which may correspond to the shift clock CLK of the signal transfer part ST(n) shown in the right portion of FIG. 7. The (n−1)th carry signal line C(n−1) described above for FIG. 10 may correspond to the carry signal line EM2_C(n−1) of FIG. 10, which may receive the carry signal EM2_CR from the previous signal transfer part ST(n−1) shown in the right portion of FIG. 7. The first-2 control node Qb(n−1) of the (n−1)th signal transfer part ST(n−1) descried above for FIG. 10 may correspond to the node EM2_Qb(n−1) shown in FIG. 10, which may receive the signal EM2_Qb from the (n−1)th signal transfer part ST(n−1) shown in the right portion of FIG. 7. The carry signal line EM2_C(n) of FIG. 10 may provide the carry signal EM2_CR of the signal transfer part ST(n) shown in the right portion of FIG. 7. The carry signal line EM1_C(n) of FIG. 10 may receive the carry signal EM1_C(n) of FIG. 8, which may correspond to the carry signal EM1_C(n) of FIG. 7.

The second EM signal EM2(*n*) of FIG. 10 may correspond to the second EM signal EM2(*n*) of the signal transfer part ST(n) shown in the right portion of FIG. 7. The second SCAN signal SCAN2(*n*+2) of FIG. 10 may correspond to the second SCAN signal SCAN2_DMY2 of the signal transfer part ST(n) shown in the right portion of FIG. 7. The third SCAN signal SCAN3(*n*+2) of FIG. 10 may correspond to the third SCAN signal SCAN3_DMY2 of the signal transfer part ST(n) shown in the right portion of FIG. 7.

In one or more examples, the signals SCAN2_DMY1, SCAN3_DMY1, SCAN2_DMY2, and SCAN3_DMY2 may be referred to as SCAN2(*n*+1), SCAN3(*n*+1), SCAN2(*n*+2), and SCAN3(*n*+2). In an example, the signals SCAN2_DMY2 and SCAN3_DMY2 shown in FIG. 7 may correspond to the signals SCAN2(*n*+2) and SCAN3(*n*+2) shown in FIG. 10.

In one or more examples, the gate signals EM2(*n*), SCAN2(*n*+1) and SCAN3(*n*+2) of FIG. 10 may be denoted differently, such as gate signals EM2(*n*), SCAN2(*n*) and SCAN3(*n*).

For one or more examples of the second EM signals EM2, the notations EM2(*n*−2), EM2(*n*−1), EM2(*n*) and the like are used only to distinguish one second EM signal from another second EM signal. In an example, the gate signal EM2(*n*−1) may precede the gate signal EM2(*n*). As shown in FIG. 6, different second EM signals may be supplied to different pixel circuits.

Similarly, for one or more examples of the second scan signals SCAN2, the notations SCAN2(*n*), SCAN2(*n*+1), SCAN2(*n*+2), SCAN2_DMY1, SCAN2_DMY2 and the like are used only to distinguish one second scan signal SCAN2 from another second scan signal SCAN2. In an example, the second scan signal SCAN2(*n*) may precede the second scan signal SCAN2(*n*+1). As shown in FIG. 6, different second scan signals SCAN2 may be supplied to different pixel circuits.

Similarly, for one or more examples of the third scan signals SCAN3, the notations SCAN3(*n*), SCAN3(*n*+1), SCAN3(*n*+2), SCAN3_DMY1, SCAN3_DMY2 and the like are used only to distinguish one third scan signal SCAN3 from another third scan signal SCAN3. In an example, the third scan signal SCAN3(*n*) may precede the third scan signal SCAN3(*n*+1). As shown in FIG. 6, different third scan signals SCAN3 may be supplied to different pixel circuits.

In an example, a first-1 control signal, a first-2 control signal, a second-1 control signal, a second-2 control signal, a third-1 control signal, and a third-2 control signal may be provided at a first-1 control node, a first-2 control node, a second-1 control node, a second-2 control node, a third-1 control node, and the third-2 control node, respectively.

In one or more examples, a notation with respect to a line (e.g., EM1_C(n)) or a notation with respect to a node (e.g., Q(n)) may correspond to a signal, and vice versa. In one or more examples, an element (e.g., a circuit or part) may be one or more elements (e.g., one or more circuits or parts). In one or more examples, signal transfer circuits may correspond to signal transfer parts. In one or more examples, first, second and third output circuits may correspond to first, second and third output circuit parts, respectively.

Although the example embodiments of the present disclosure have been described in more detail with reference to the accompanying drawings, the present disclosure is not limited thereto and may be embodied in many different forms without departing from the technical concept of the present disclosure. Therefore, the example embodiments disclosed in the present disclosure are provided for illustrative purposes only and are not intended to limit the technical concept of the present disclosure. The scope of the technical concept of the present disclosure is not limited thereto.

Therefore, it should be understood that the above-described embodiments are illustrative in all aspects and do not limit the present disclosure.

What is claimed is:

1. A gate driver, comprising:

a plurality of signal transfer circuits, wherein each of the plurality of signal transfer circuits is connected to a respective carry line to which a respective preceding signal transfer circuit is configured to apply a respective carry signal, to cause each of the plurality of signal transfer circuits to operate dependently of at least the respective preceding signal transfer circuit, and wherein each of the plurality of signal transfer circuits includes:

a first output circuit configured to receive the respective carry signal from the respective preceding signal transfer circuit and to output a carry signal and a first gate signal according to a voltage of a first-1 control node and a voltage of a first-2 control node;

a second output circuit configured to output a second gate signal according to a voltage of a second-1 control node and a voltage of a second-2 control node, in response to the second-1 control node being connected to the first-2 control node and the second-2 control node being connected to the first-1 control node; and a third output circuit configured to output a third gate signal according to a voltage of a third-1 control node and a voltage of a third-2 control node, in response to the third-1 control node being connected to the first-2 control node and the third-2 control node being connected to the first-1 control node.

2. The gate driver of claim 1, wherein the first output circuit includes:

first-1 pull-up and first-1 pull-down transistors configured to output the first gate signal to a first-1 output node according to the voltages of the first-1 and first-2 control nodes; and first-2 pull-up and first-2 pull-down transistors configured to output the carry signal to a first-2 output node according to the voltages of the first-1 and first-2 control nodes.

3. The gate driver of claim 2, wherein the second output circuit includes:

second pull-up and second pull-down transistors configured to output the second gate signal to a second output node according to the voltages of the second-1 and second-2 control nodes.

4. The gate driver of claim 3, wherein:

the second output circuit further includes a second-1 transistor, a second-2 transistor, a second-3 transistor, and a second-4 transistor;

the second-1 transistor includes a gate electrode connected to the first-2 output node, a first electrode connected to a first potential voltage line, and a second electrode connected to a second-1 node;

the second-2 transistor includes a gate electrode connected to the second-1 node, a first electrode connected to the first-2 control node, and a second electrode connected to the second-1 control node;

the second-3 transistor includes a gate electrode connected to the first-2 control node, a first electrode connected to a carry signal line of a first light emission driver, and a second electrode connected to the second-1 node; and the second-4 transistor includes a gate electrode connected to the second-1 node, a first electrode connected to the first-1 control node, and a second electrode connected to the second-2 control node.

5. The gate driver of claim 4, wherein:

the second output circuit further includes a second-5 transistor, a second-6 transistor, and a second-7 transistor;

the second-5 transistor includes a gate electrode and a first electrode connected to a first-2 control node of the first light emission driver, and a second electrode connected to a second-2 node;

the second-6 transistor includes a gate electrode connected to the second-2 node, a first electrode connected to the second-1 control node, and a second electrode connected to the first potential voltage line; and the second-7 transistor includes a gate electrode connected to the second-2 node, a first electrode connected to the second-2 control node, and a second electrode connected to a second potential voltage line.

6. The gate driver of claim 3, wherein the third output circuit includes:

third pull-up and third pull-down transistors configured to output the third gate signal to a third output node according to the voltages of the third-1 and third-2 control nodes.

7. The gate driver of claim 6, wherein:

the third output circuit further includes a third-1 transistor and a third-2 transistor;

the third-1 transistor includes a gate electrode connected to a first-2 control node of the respective preceding signal transfer circuit, a first electrode connected to the first-2 control node of the first output circuit, and a second electrode connected to the third-1 control node; and the third-2 transistor includes a gate electrode connected to the first-2 control node of the respective preceding signal transfer circuit, a first electrode connected to the first-1 control node, and a second electrode connected to the third-2 control node.

8. The gate driver of claim 7, wherein:

the third output circuit further includes a third-3 transistor, a third-4 transistor, a third-5 transistor, and a third-6 transistor;

the third-3 transistor includes a gate electrode connected to a carry signal line of a first light emission driver, a first electrode connected to a second-2 node, and a second electrode connected to a second-3 node;

the third-4 transistor includes a gate electrode connected to the carry signal line of the first light emission driver, a first electrode connected to the first-2 output node, and a second electrode connected to the second-3 node;

the third-5 transistor includes a gate electrode connected to the second-3 node, a first electrode connected to the third-1 control node, and a second electrode connected to a first potential voltage line; and the third-6 transistor includes a gate electrode connected to the second-3 node, a first electrode connected to the third-2 control node, and a second electrode connected to a second potential voltage line.

9. A display device, comprising:

a display panel in which a plurality of data lines, a plurality of gate lines intersecting the data lines, and a plurality of pixels are arranged;

a data driver configured to supply data voltages of pixel data to the plurality of data lines; and a gate driver configured to supply gate signals to the plurality of gate lines, wherein the gate driver includes a plurality of signal transfer circuits, wherein each of the plurality of signal transfer circuits is connected to a respective carry line to which a respective preceding signal transfer circuit is configured to apply a respective carry signal, to cause each of the plurality of signal transfer circuits to operate dependently of at least the respective preceding signal transfer circuit, and wherein each of the plurality of signal transfer circuits includes:

a first output circuit configured to receive the respective carry signal from the respective preceding signal transfer circuit and to output a carry signal and a first gate signal according to a voltage of a first-1 control node and a voltage of a first-2 control node;

a second output circuit configured to output a second gate signal according to a voltage of a second-1 control node and a voltage of a second-2 control node, in response to the second-1 control node being connected to the first-2 control node and the second-2 control node being connected to the first-1 control node; and a third output circuit configured to output a third gate signal according to a voltage of a third-1 control node and a voltage of a third-2 control node, in response to the third-1 control node being connected to the first-2 control node and the third-2 control node being connected to the first-1 control node.

10. The display device of claim 9, wherein the first output circuit includes:

first-1 pull-up and first-1 pull-down transistors configured to output the first gate signal to a first-1 output node according to the voltages of the first-1 and first-2 control nodes; and first-2 pull-up and first-2 pull-down transistors configured to output the carry signal to a first-2 output node according to the voltages of the first-1 and first-2 control nodes.

11. The display device of claim 10, wherein the second output circuit includes:

second pull-up and second pull-down transistors configured to output the second gate signal to a second output node according to the voltages of the second-1 and second-2 control nodes.

12. The display device of claim 11, wherein:

the second output circuit further includes a second-1 transistor, a second-2 transistor, a second-3 transistor, and a second-4 transistor;

the second-1 transistor includes a gate electrode connected to the first-2 output node, a first electrode connected to a first potential voltage line, and a second electrode connected to a second-1 node;

the second-2 transistor includes a gate electrode connected to the second-1 node, a first electrode connected to the first-2 control node, and a second electrode connected to the second-1 control node;

the second-3 transistor includes a gate electrode connected to the first-2 control node, a first electrode connected to a carry signal line of a first light emission driver, and a second electrode connected to the second-1 node; and the second-4 transistor includes a gate electrode connected to the second-1 node, a first electrode connected to the first-1 control node, and a second electrode connected to the second-2 control node.

13. The display device of claim 12, wherein:

the second output circuit further includes a second-5 transistor, a second-6 transistor, and a second-7 transistor;

the second-5 transistor includes a gate electrode and a first electrode connected to a first-2 control node of the first light emission driver, and a second electrode connected to a second-2 node;

the second-6 transistor includes a gate electrode connected to the second-2 node, a first electrode connected to the second-1 control node, and a second electrode connected to the first potential voltage line; and the second-7 transistor includes a gate electrode connected to the second-2 node, a first electrode connected to the second-2 control node, and a second electrode connected to a second potential voltage line.

14. The display device of claim 11, wherein the third output circuit includes:

third pull-up and third pull-down transistors configured to output the third gate signal to a third output node according to the voltages of the third-1 and third-2 control nodes.

15. The display device of claim 14, wherein:

the third output circuit further includes a third-1 transistor and a third-2 transistor;

the third-1 transistor includes a gate electrode connected to a first-2 control node of the respective preceding signal transfer circuit, a first electrode connected to the first-2 control node of the first output circuit, and a second electrode connected to the third-1 control node; and the third-2 transistor includes a gate electrode connected to the first-2 control node of the respective preceding signal transfer circuit, a first electrode connected to the first-1 control node, and a second electrode connected to the third-2 control node.

16. The display device of claim 15, wherein:

the third output circuit further includes a third-3 transistor, a third-4 transistor, a third-5 transistor, and a third-6 transistor;

the third-3 transistor includes a gate electrode connected to a carry signal line of a first light emission driver, a first electrode connected to a second-2 node, and a second electrode connected to a second-3 node;

the third-4 transistor includes a gate electrode connected to the carry signal line of the first light emission driver, a first electrode connected to the first-2 output node, and a second electrode connected to the second-3 node;

the third-5 transistor includes a gate electrode connected to the second-3 node, a first electrode connected to the third-1 control node, and a second electrode connected to a first potential voltage line; and the third-6 transistor includes a gate electrode connected to the second-3 node, a first electrode connected to the third-2 control node, and a second electrode connected to a second potential voltage line.

17. A display device, comprising:

a display panel in which a plurality of data lines, a plurality of gate lines intersecting the data lines, and a plurality of pixels are arranged;

a data driver configured to supply data voltages to the plurality of data lines; and a gate driver configured to supply gate signals to the plurality of gate lines, wherein the gate driver includes a plurality of signal transfer circuits, wherein each of the plurality of signal transfer circuits is connected to a respective carry line to which a respective preceding signal transfer circuit is configured to apply a respective carry signal, to cause each of the plurality of signal transfer circuits to operate dependently of at least the respective preceding signal transfer circuit, and wherein each of the plurality of signal transfer circuits includes:

a first output circuit configured to receive the respective carry signal from the respective preceding signal transfer circuit, and configured to output a carry signal and a first gate signal based on the respective carry signal, a first-1 control signal, and a first-2 control signal;

a second output circuit configured to receive the carry signal, and configured to output a second gate signal based on the carry signal and according to a second-1 control signal for being responsive to the first-2 control signal and a second-2 control signal for being responsive to the first-1 control signal; and a third output circuit configured to receive the carry signal, and configured to output a third gate signal based on the carry signal and according to a third-1 control signal for being responsive to the first-2 control signal and a third-2 control signal for being responsive to the first-1 control signal.

18. The display device of claim 17, wherein:

the first output circuit includes:

a first-1 pull-up transistor configured to receive the first-1 control signal; and a first-1 pull-down transistor configured to receive the first-2 control signal; and the first-1 pull-up and first-1 pull-down transistors are configured to output the first gate signal according to the first-1 and first-2 control signals.

19. The display device of claim 18, wherein:

the second output circuit includes:

a second pull-up transistor configured to receive the second-1 control signal for being responsive to the first-2 control signal; and a second pull-down transistor configured to receive the second-2 control signal for being responsive to the first-1 control signal; and the second pull-up and second pull-down transistors are configured to output the second gate signal according to the second-1 and second-2 control signals for being responsive to the first-2 and first-1 control signals, respectively.

20. The display device of claim 19, wherein:

the third output circuit includes:

a third pull-up transistor configured to receive the third-1 control signal for being responsive to the first-2 control signal; and a third pull-down transistor configured to receive the third-2 control signal for being responsive to the first-1 control signal; and the third pull-up and third pull-down transistors are configured to output the third gate signal according to the third-1 and third-2 control signals for being responsive to the first-2 and first-1 control signals, respectively.

* * * * *